United States Patent
Kouchmeshky et al.

(10) Patent No.: US 10,061,051 B2
(45) Date of Patent: Aug. 28, 2018

(54) WHOLE-SPACE INVERSION USING PHASE CORRECTION METHOD FOR MULTI-FREQUENCY DIELECTRIC ARRAY LOGGING TOOL

(71) Applicant: BAKER HUGHES INCORPORATED, Houston, TX (US)

(72) Inventors: Babak Kouchmeshky, Kingwood, TX (US); Otto N. Fanini, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/280,815

(22) Filed: Sep. 29, 2016

(65) Prior Publication Data

US 2017/0102479 A1   Apr. 13, 2017

Related U.S. Application Data

(60) Provisional application No. 62/240,449, filed on Oct. 12, 2015.

(51) Int. Cl.
*G01V 3/30* (2006.01)
*E21B 47/12* (2012.01)
(Continued)

(52) U.S. Cl.
CPC .............. *G01V 3/30* (2013.01); *E21B 47/122* (2013.01); *H04Q 9/12* (2013.01); *E21B 47/01* (2013.01);
(Continued)

(58) Field of Classification Search
CPC .......... G01V 11/002; G01V 3/08; G01V 3/38; G01V 3/30; E21B 47/02216; E21B 47/122; E21B 47/0002
See application file for complete search history.

(56) References Cited

U.S. PATENT DOCUMENTS

2002/0101242 A1* 8/2002 Bittar ................. G01V 3/30
324/338
2005/0189946 A1   9/2005 Moore
(Continued)

FOREIGN PATENT DOCUMENTS

WO   2001-11390 A1   2/2001
WO   2015-038099 A1   3/2015

OTHER PUBLICATIONS

Int'l Search Report and Written Opinion in PCT/2016/054972 dated Jan. 12, 2017.

*Primary Examiner* — Kabir A Timory
(74) *Attorney, Agent, or Firm* — Mossman, Kumar & Tyler, PC

(57) ABSTRACT

Systems, methods, and devices for evaluation of an earth formation intersected by a borehole using a logging tool. Methods include exciting an upper and lower transmitter; receiving signals at a plurality of receivers between the upper and lower transmitter; estimating a phase shift attributable to a volume of interest of the formation adjacent to a section of the carrier corresponding to the plurality of receivers by estimating phase shifts attributable only to portions of the volume of interest adjacent to corresponding portions of the section between each adjacent pair of receivers of the plurality of receivers; wherein each adjacent pair is positioned at a corresponding distance that is no more than half of the shortest wavelength of those wavelengths associated with the received signals. Estimating a phase shift between an adjacent pair of receivers may be carried out using a first relative phase value; and a second relative phase value.

24 Claims, 30 Drawing Sheets

(51) Int. Cl.
*H04Q 9/12* (2006.01)
*E21B 47/01* (2012.01)
*E21B 47/022* (2012.01)
*E21B 47/08* (2012.01)
*E21B 47/14* (2006.01)

(52) U.S. Cl.
CPC ....... *E21B 47/02216* (2013.01); *E21B 47/082* (2013.01); *E21B 47/14* (2013.01)

(56) References Cited

U.S. PATENT DOCUMENTS

| | | | |
|---|---|---|---|
| 2011/0221443 A1* | 9/2011 | Bittar | G01V 3/30 |
| | | | 324/339 |
| 2014/0192621 A1 | 7/2014 | Ram et al. | |
| 2015/0276966 A1 | 10/2015 | Wang et al. | |

* cited by examiner

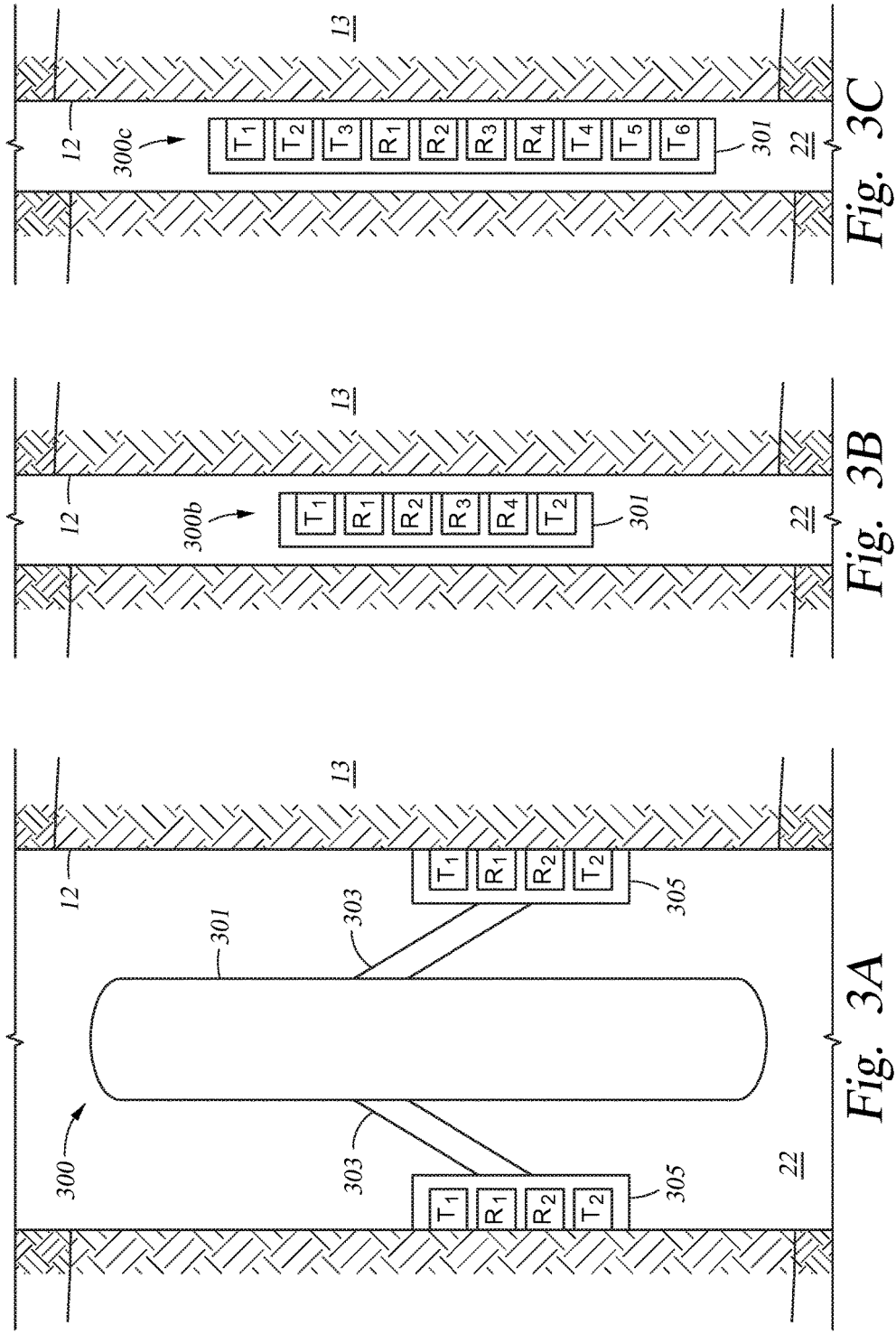

ACTUAL PHASE DIFFERENCE = 60° - 90° = -30° $\stackrel{DEF}{=}$ 330°

PHASE SHIFT: $\theta_{R_1}^{SH}$ $\theta_{R_2}^{SH}$ $\theta_{R_3}^{SH}$ $\theta_{R_4}^{SH}$

WHOLE-SPACE INVERSION USING PHASE CORRECTION METHOD FOR MULTI-FREQUENCY DIELECTRIC ARRAY LOGGING TOOL

CROSS-REFERENCE TO RELATED APPLICATION

This application claims priority from U.S. Provisional Patent Application Ser. No. 62/240,449, filed Oct. 12, 2015, which is incorporated herein by reference in its entirety.

FIELD OF THE DISCLOSURE

This disclosure generally relates to exploration for hydrocarbons involving electrical investigations of a borehole penetrating an earth formation. More specifically, this disclosure relates to a novel method for phase correction.

BACKGROUND OF THE DISCLOSURE

Electrical earth borehole logging is well known and various devices and various techniques have been described for this purpose. Properties of the formation may be estimated by transmitting an electromagnetic (EM) wave in the formation, and receiving related signals at receiver antennas. Logging instruments are used to determine the permittivity and electrical conductivity, and its converse, resistivity, of earth formations penetrated by a borehole. The electrical conductivity is used for, among other reasons, inferring the fluid content of the earth formations and distances to bed boundaries. Typically, lower conductivity (higher resistivity) is associated with hydrocarbon-bearing earth formations.

SUMMARY OF THE DISCLOSURE

In aspects, the present disclosure is related to methods and apparatuses for evaluating an earth formation using a measured phase shift. The phase shift may be measured from electromagnetic wave propagation measurements using a multi-frequency dielectric array tool in a borehole intersecting earth formation.

General method embodiments include exciting an upper transmitter and a lower transmitter on a carrier in the borehole at at least one frequency; receiving signals at a plurality of receivers between the upper transmitter and the lower transmitter on the carrier responsive to the excitation, wherein a section of the carrier includes a plurality of receivers; estimating a phase shift attributable to only a volume of interest of the formation adjacent to a section of the carrier corresponding to the plurality of receivers by estimating phase shifts attributable only to portions of the volume of interest adjacent to corresponding portions of the section between pairs of receivers of the plurality of receivers; wherein each pair is positioned at a corresponding distance that is no more than half of the shortest wavelength of those wavelengths associated with the received signals. The phase shift of the volume of interest or the portion may be used in further calculations to estimate a phase shift between the transmitter and a single receiver.

Estimating the phase shifts attributable only to portions of the volume of interest adjacent to corresponding portions of the section between each of the pairs of receivers may be carried out by reducing by 180 degrees calculated phase shifts for each of the portions of the volume of interest not within a range from a pre-determined lower limit to 180 degrees from the pre-determined lower limit. Methods may include identifying the pre-determined lower limit based on a distance between each of the pairs of receivers, a range of values for the at least one frequency, and a range of expected values for at least one formation property.

In embodiments, each of the at least one frequency may be at least 200 kHz. At least one of the at least one frequency may be at least 1 GHz. Methods may include using the estimated phase shift and an estimated signal attenuation to estimate a formation property of the volume of interest. The formation property of the volume of interest may include at least one of: i) resistivity; ii) conductivity; and iii) permittivity. Estimating the formation property may include using the estimated signal attenuation and the estimated phase shift in an inversion by modeling the earth formation as a homogenous wholespace. Methods may include conducting a validity check on a model resulting from the modeling by comparing the formation property estimated for the section with a formation property estimated for the portion of the section.

Methods may include conducting at least one of: i) an interpolation operation, and ii) a filtering operation, upon determining that the formation parameter estimated for the section is substantially different that the formation parameter estimated for the portion of the section. Methods may include using the estimated phase shift and an estimated signal attenuation to estimate a first estimated value of a formation property of the volume of interest; conducting a second excitation comprising exciting a second upper transmitter non-collocated with the upper transmitter and a second lower transmitter non-collocated with the lower transmitter on a carrier in the borehole at at least one frequency; receiving signals at the plurality of receivers responsive to the second excitation; estimating a second phase shift in the received signals responsive to the second excitation attributable to only a volume of interest of the formation adjacent to a section of the carrier corresponding to the plurality of receivers by estimating phase shifts attributable only to portions of the volume of interest adjacent to corresponding portions of the section between pairs of receivers of the plurality of receivers; and using the estimated second phase shift and an estimated second signal attenuation to estimate a second estimated value of a formation property of the volume of interest; and conducting a radial layer analysis upon determining that the first estimated value of the formation property and the second estimated value of the formation property are not substantially similar.

The at least one frequency may include a series of frequencies, and methods may include conducting a quality check by comparing estimated formation parameters corresponding to the frequencies to a trend comprising at least one of: i) estimated formation parameters increase with increases in frequency, and ii) estimated formation parameters decrease with increases in frequency. Methods may include conducting at least one of an interpolation operation and a filtering operation upon determining that the formation parameters fail to follow the trend.

Methods may include exciting an upper transmitter and a lower transmitter on a carrier in the borehole at a plurality of frequencies at each of a plurality of borehole depths, wherein no frequency of the plurality of frequencies is within 50 MHz of another frequency of the plurality of frequencies and no depth of the plurality of depths is within a distance d of another depth of the plurality of depths, wherein $d=0.1 \lambda s$, and wherein $\lambda s$ is the shortest wavelength of those wavelengths associated with the received signals.

The information received in the signals may lack sufficient information density to plot variations in phase shift as a smooth curve. The excitation of the upper transmitter and the lower transmitter may produce electromagnetic waves which propagate through the volume of interest to the plurality of receivers.

Methods may include exciting an upper transmitter and a lower transmitter on a carrier in the borehole at at least one frequency; receiving signals at a plurality of receivers between the upper transmitter and the lower transmitter on the carrier responsive to the excitation; estimating a phase shift attributable to only a volume of interest of the formation adjacent to a section of the carrier between a pair of receivers of the plurality of receivers using: a first relative phase value comprising a measured phase shift between signals received at a first receiver of the pair of receivers and signals received at a second receiver responsive to excitation of the upper transmitter; and a second relative phase value comprising a measured phase shift between signals received at a second receiver of the pair of receivers and signals received at a first receiver responsive to excitation of the lower transmitter.

Estimating the phase shift attributable to only a volume of interest of the formation adjacent to a section of the carrier between a pair of receivers may include calculating a phase shift using the first relative phase value and the second relative phase value; and reducing the calculated phase shift by 180 degrees if the calculated phase shift is not within a range from a pre-determined lower limit to 180 degrees from the pre-determined lower limit. The transmitters and receivers may be unsynchronized.

General device embodiments may include a carrier configured to convey an upper transmitter, a lower transmitter, and a plurality of receivers between the upper transmitter and the lower transmitter in the borehole; and at least one processor configured to execute a method, the method comprising: exciting an upper transmitter and a lower transmitter in the borehole at at least one frequency; receiving signals at a plurality of receivers between the upper transmitter and the lower transmitter on the carrier responsive to the excitation, wherein a section of the carrier includes a plurality of receivers; and estimating a phase shift attributable to only a volume of interest of the formation adjacent to a section of the carrier corresponding to the plurality of receivers by estimating phase shifts attributable only to portions of the volume of interest adjacent to corresponding portions of the section between pairs of receivers of the plurality of receivers; wherein each pair is positioned at a corresponding distance that is no more than half of the shortest wavelength of those wavelengths associated with the received signals.

The processor may be configured to estimate the phase shifts attributable only to portions of the volume of interest adjacent to corresponding portions of the section between each pair of receivers by reducing by 180 degrees calculated phase shifts for each of the portions of the volume of interest not within a range from a pre-determined lower limit to 180 degrees from the pre-determined lower limit.

Another device embodiment may include a carrier configured to convey an upper transmitter, a lower transmitter, and a plurality of receivers between the upper transmitter and the lower transmitter in the borehole; and at least one processor configured to execute a method, the method comprising: exciting the upper transmitter and the lower transmitter in the borehole at at least one frequency; receiving signals at a plurality of receivers responsive to the excitation; and estimating a phase shift attributable to only a volume of interest of the formation adjacent to a section of the carrier between a pair of receivers of the plurality of receivers using: a first relative phase value comprising a measured phase shift between signals received at a first receiver of the pair of receivers and signals received at a second receiver responsive to excitation of the upper transmitter; and a second relative phase value comprising a measured phase shift between signals received at a second receiver of the pair of receivers and signals received at a first receiver responsive to excitation of the lower transmitter.

Further method embodiments may include exciting an upper transmitter and a lower transmitter on a carrier in the borehole at at least one frequency; receiving signals at a plurality of receivers between the upper transmitter and the lower transmitter on the carrier responsive to the excitation, wherein a section of the carrier includes a plurality of receivers; estimating a phase shift attributable to only a volume of interest of the formation adjacent to a section of the carrier corresponding to the plurality of receivers by estimating phase shifts attributable only to portions of the volume of interest adjacent to corresponding portions of the section between pairs of receivers of the plurality of receivers; wherein the upper transmitter, the lower transmitter and each of the plurality of receivers has a corresponding unknown internal electronic equipment phase shift error. At least one of the corresponding unknown internal electronic equipment phase shift errors may be dependent upon at least one of i) temperature; and ii) pressure.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIGS. 3A-3C show cross-sectional views of multi-frequency dielectric logging tools in accordance with embodiments of the present disclosure;

DETAILED DESCRIPTION

Figure 1:
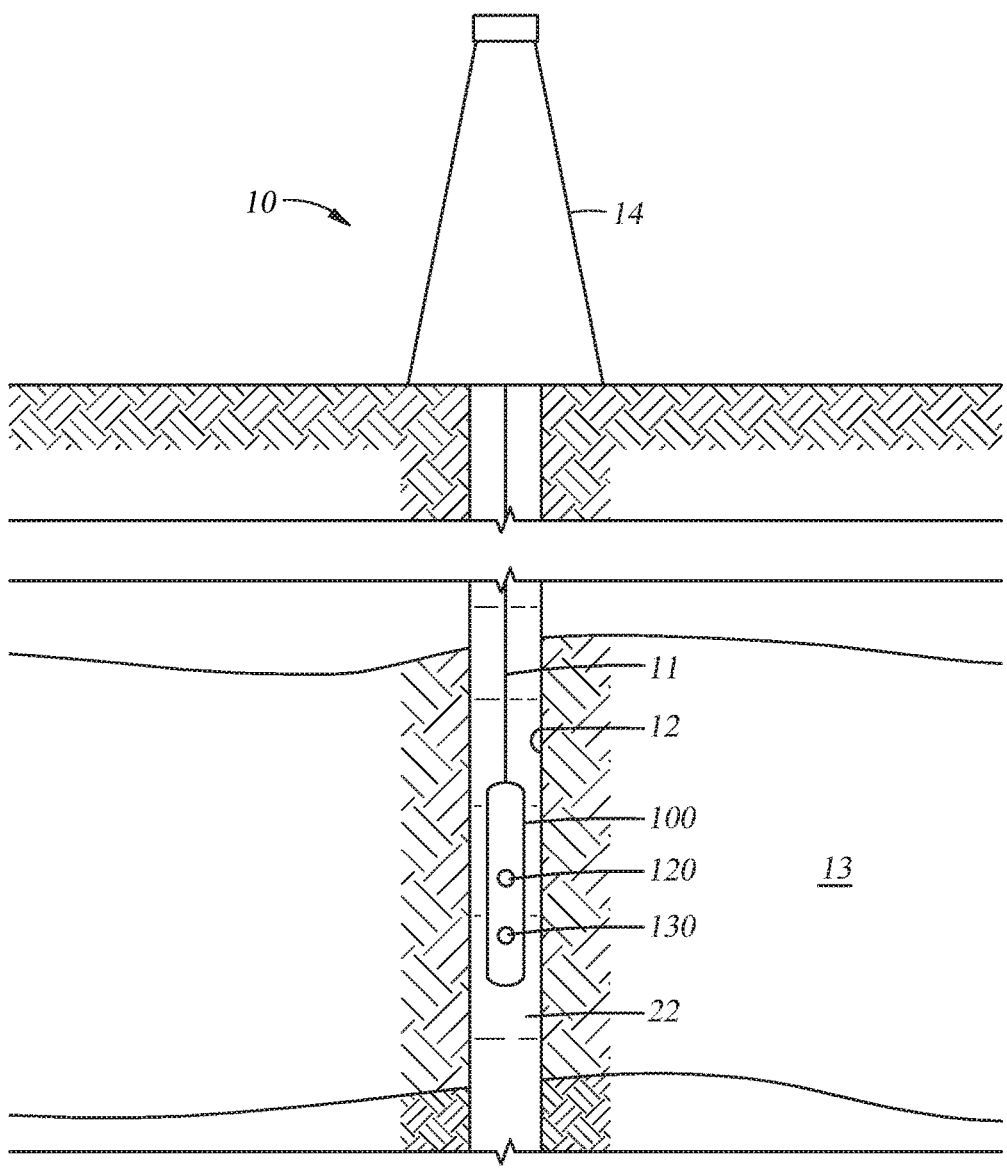
FIG. 1 shows a schematic of a borehole including a downhole tool for estimating a parameter of interest of an earth formation according to embodiments of the present disclosure.

This disclosure generally relates to evaluation of an earth formation, which may include exploration for hydrocarbons involving electromagnetic investigations of a borehole penetrating the earth formation. These investigations may include estimating at least one parameter of interest of the earth formation.

The present disclosure is susceptible to embodiments of different forms. There are shown in the drawings, and herein will be described in detail, specific embodiments of the present disclosure with the understanding that the present disclosure is to be considered an exemplification of the principles of the disclosure, and is not intended to limit the disclosure to that illustrated and described herein. Indeed, as will become apparent, the teachings of the present disclosure can be utilized for a variety of well tools and in all phases of well construction and production. Accordingly, the embodiments discussed below are merely illustrative of the applications of the present disclosure.

Downhole electromagnetic tools are well known in the art. Aspects of the present disclosure may include various components for generating electromagnetic waves or other electrical phenomena in a formation surrounding a borehole and for sensing electrical effects of the generated phenomena, such as, for example, a plurality of coils or pads. A component (e.g., a coil) referred to herein as a transmitter may generate an oscillating signal in an adjacent geological formation, e.g., by supplying a square wave signal or other oscillating signal to a coil. Any number of oscillating voltage signals having multiple frequency components may be used. It may also be desirable that, on occasion, a single-frequency signal, such as a sinusoidal signal, is used. One application for downhole measurements is formation evaluation where the goal is to evaluate the oil content of a possible reservoir.

FIG. 1 shows an exemplary embodiment of a system for evaluation of an earth formation using measurements from a downhole electromagnet tool. The system 10 includes a carrier 11 that is shown disposed in a wellbore or borehole 12 that penetrates at least one earth formation 13 during a drilling operation and makes measurements of properties of the formation 13 and/or the borehole 12 downhole. As described herein, "borehole" or "wellbore" refers to a single hole that makes up all or part of a drilled well. Depending on the configuration, the system 10 may be used during drilling and/or after the wellbore 12 has been formed. While a land system is shown, the teachings of the present disclosure may also be utilized in offshore or subsea applications.

As described herein, "formations" refer to the various features and materials that may be encountered in a subsurface environment and surround the borehole. The term "information" includes, but is not limited to, raw data, processed data, and signals.

It should be understood that embodiments of the present disclosure are equally well suited for use in wells having various configurations including horizontal wells, deviated wells, slanted wells, multilateral wells and so on. Accordingly, use of directional terms herein (e.g., above, below, upper, lower, upward, downward, topmost, lowermost, uphole, downhole, etc) refer to the direction of travel along the borehole either toward or away from the surface, with the upward direction being toward the surface and the downward direction being away from the surface.

In one embodiment, the system 10 includes a conventional derrick 14 that may supports a rotary table that is rotated at a desired rotational speed. The carrier 11 may include one or more drill pipe sections that extend downward into the borehole 12 from the rotary table, and is connected to a drilling assembly. Drilling fluid or drilling mud 22 is pumped through the drillstring 11 and/or the borehole 12. The well drilling system 10 may also includes a bottomhole assembly (BHA). In one embodiment, a drill motor or mud motor is coupled to the drilling assembly and rotates the drilling assembly when the drilling fluid 22 is passed through the mud motor under pressure.

The system 10 includes any number of downhole tools 100 for various processes including formation drilling, geosteering, and formation evaluation (FE) for measuring versus depth and/or time one or more physical quantities in or around a borehole. The tool 100 may be included in or embodied as a BHA, drillstring component or other suitable carrier. "Carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tubing type, of the jointed pipe type and any combination or portion thereof. Other carriers include, but are not limited to, casing pipes, wirelines, wireline sondes, slickline sondes, drop shots, downhole subs, bottom-hole assemblies, and drill strings.

In one embodiment, one or more downhole components, such as the drillstring 11 or the downhole tool 100, may include sensor devices 120 configured to measure various parameters of the formation and/or borehole. For example, one or more parameter sensors 120 (or sensor assemblies such as MWD subs) are configured for formation evaluation measurements and/or other parameters of interest (referred to herein as "evaluation parameters") relating to the formation, borehole, geophysical characteristics, borehole fluids and boundary conditions. These sensors 120 may include formation evaluation sensors (e.g., resistivity, dielectric constant, water saturation, porosity, density, permeability, anisotropy, or shale volume), sensors for measuring borehole parameters (e.g., borehole size, borehole inclination and azimuth, and borehole roughness), sensors for measuring geophysical parameters (e.g., acoustic velocity, acoustic travel time, electrical resistivity), sensors for measuring borehole fluid parameters (e.g., viscosity, density, clarity, rheology, pH level, and gas, oil and water contents), boundary condition sensors, and sensors for measuring physical and chemical properties of the borehole fluid. The system 10 may also include sensors 130 for measuring force, operational and/or environmental parameters related to bending or other static and/or dynamic deformation of one or more downhole components.

Figure 12:
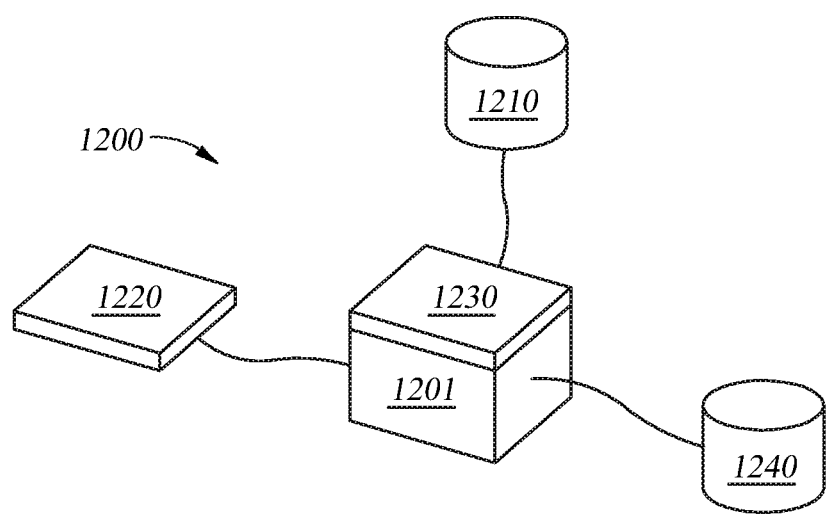
FIG. 12 shows a schematic of information processing system for implementing methods in accordance with embodiments of the present disclosure.

Downhole tool 100 may be coupled or combined with additional tools including some or all the hardware environment 1200, as shown in FIG. 12 below. The hardware environment may implement one or more control units configured to operate the tool 100 or other components of system 10, and/or conduct method embodiments disclosed below.

A point of novelty of the system illustrated in FIG. 1 is that the control unit(s) is configured to perform certain methods (discussed below) that are not in the prior art. A surface control unit and/or downhole control unit may be configured to control sensors described above and to estimate a parameter of interest according to methods described herein. Control of these components may be carried out using one or more models or algorithms using methods described below.

Mathematical models, look-up tables, or other models representing relationships between the signals and the values of the formation properties may be used to characterize operations in the formation or the formation itself, optimize one or more operational parameters of a production or development, and so on. The system may carry out these actions through notifications, advice, and/or intelligent control.

Various types of electrical sensors may be used in evaluating the formation in accordance with embodiments disclosed herein. As one example, sensors that are based on electromagnetic (EM) wave propagation are used for many applications where amplitude and phase of wave traveled in an unknown medium are studied to infer the properties of that medium. Although aspects of the disclosure may be particularly useful in addressing challenges associated with (EM) wave propagation, particular embodiments may employ the techniques disclosed herein in connection with various types of induction logging, including multi-component induction logging.

Obtaining accurate phase readings at high frequencies can be challenging due to several factors, including phase shifts associated with the various electrical components of the tool itself, known as internal phase shifts. Conventionally, several different methods may be used to correct this problem, including calibration by a known medium, synchronization of the components, and compensation of the measurement using various algorithms. The primary challenge to calibration is the possibility of drift of internal phase shifts over time and sensitivity to environmental parameters such as temperature.

Some synchronization techniques, such as phase-locked loops, may increase costs and complicate tool design. They can also be sensitive to noise. Other synchronization methods require transmitting data between transmitter and receiver and time stamping the data at each step. These methods fail to provide exact estimation of phase shift in situations where the time delay (phase) associated with signal traveling between transmitter and receiver is unknown, such as when the aim of probing device is to identify the material properties of the medium and hence this information cannot be used to correctly identify the phase shift by the time stamping method.

Using an internal electrical path with known properties for sending time stamped messages may also be problematic when direct access between transmitter and receiver is not possible, when high frequency of operation enforces strict constraints on the acceptable tolerance of the length of cable, or when there is a need for adding acquisition, amplifier, or matching circuit boards after the path used for internal connection between transmitter and receiver nodes. Even when a common clock is used for transmitter and receiver, the existence of (perhaps several) non-identical electrical components (e.g., amplifier and matching network), as well as delay caused by lengths of transmission line between clock, transmitter, and receiver, causes components to be out of phase with each other. As any addition to the system would introduce unknown phase shifts, accurate estimation of phase may be problematic.

Because of these issues, compensation of phase measurements is widely employed. However, scenarios exist for which conventional measurement compensation techniques are also unreliable. For example, frequency sparseness (where only a few discrete frequencies are available with tens or hundreds of MHz between them) and sampling sparseness may frustrate compensation according to typical techniques. Situations where the relative distance between receivers is comparable to wavelength may also be problematic, because it is not possible to observe a smooth variation in relative phase difference. Common environmental conditions, such as measurement in a heterogeneous medium, may also complicate accurate measurement. A brief description of traditional compensated measurement techniques for mitigating the effects of internal phase shift follows.

Figure 2A:
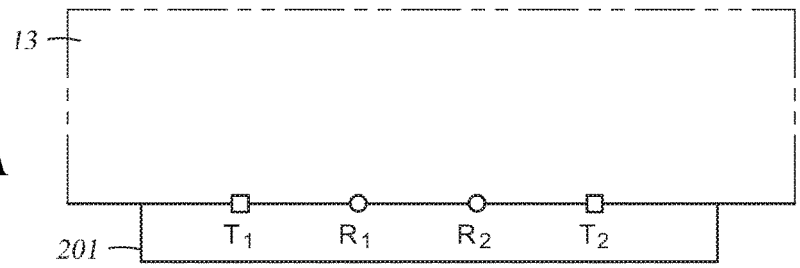
FIG. 2A shows a cross-sectional view of an electromagnetic wave propagation tool in a homogenous medium according to embodiments of the present disclosure.

FIG. 2A depicts a cross-sectional view of downhole tool 201 (e.g., electromagnetic tool, dielectric tool, or other logging tool, etc.) in a homogenous medium. The tool 201 may include transmitters T1, T2 and receivers R1, R2. The transmitters T1, T2 may be symmetrically arranged with the receivers R1, R2. That is, the distance from T1 to R1 may be equal to the distance from T2 to R2; and the distance from T1 to R2 may be equal to the distance from T2 to R1.

A conventional technique of measurement compensation involving two receivers positioned symmetrically with respect to two transmitters (as shown in FIG. 2A) is demonstrated. The relative phase shift between R1 and R2 when T1 is fired may be given by:

$$\theta_{R_1R_2}{}^{T1} = \theta_{R_2}{}^{T1} - \theta_{R_1}{}^{T1} \qquad (1)$$

The relative phase shift between R1 and R2 when T2 is fired may be given by:

$$\theta_{R_1R_2}^{T2}=\theta_{R_1}^{T2}-\theta_{R_2}^{T2} \quad (2)$$

The compensated relative phase may be given by:

$$\theta_{R_1R_2}=0.5(\theta_{R_1R_2}^{T1}+\theta_{R_1R_2}^{T2}) \quad (3)$$

where $\theta_{R_j}^{T_i}$ is the phase measured by receiver j when transmitter i is fired and can be written as $$\theta_{R_j}^{T_i}=\theta_{T_i}+\theta_{R_j}+\theta(r) \quad (4)$$

in which $\theta_{T_i}$ and $\theta_{R_j}$ are the phase shifts of transmitter i and receiver j with respect to a common source and $\theta(r)$ is the phase shift due to wave traveling in the probed medium between transmitter and receiver which are apart by a distance of r.

Equations (1) and (2) eliminate the effect of internal phase shift at T1 and T2. As it can be seen from plugging in Equation 4 in Equations 1 and 2 and using Equation 3 one can eliminate the effect of phase shift at R1 and R2. The assumption behind this method is that the wave traveling from either of the transmitters would experience the same phase shift in the probed medium which means that the medium in front of the transmitter and receiver should be homogenous or symmetrically positioned (with respect to transmitters and receivers) heterogeneous.

Figure 2B:
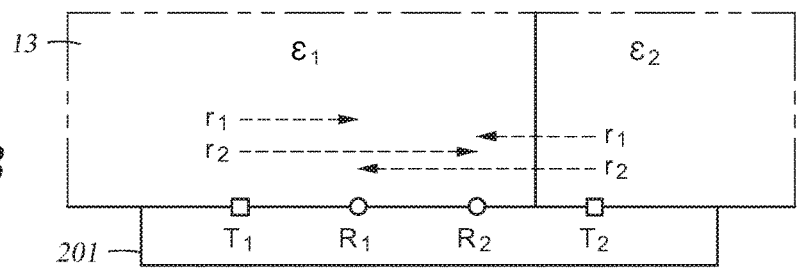
FIG. 2B shows a cross-sectional view of an electromagnetic wave propagation tool in heterogeneous media according to embodiments of the present disclosure.

FIG. 2B depicts a cross-sectional view of tool 201 in heterogenous media having relative permittivities, $\varepsilon_1$ and $\varepsilon_2$. Generally, for an electromagnetic wave propagating in a near field regime, the phase difference between the wave passing through points in space is not only a function of the distance between the two points $(r_2-r_1)$ but also a function of absolute position of those points $(r_1$ and $r_2)$. Consider the medium of FIG. 2B, where the tool is positioned in a way that the interface between medium 1 and medium 2 is located between Transmitter 2 and the closest receiver (Receiver 2). Ignoring the effect of reflection at the interface, the effect of medium 2 can be replaced by an equivalent medium with the same properties as of medium 1, but with longer distance between Transmitter 2 and receivers (since $\varepsilon_2 > \varepsilon_1$).

Figure 2C:
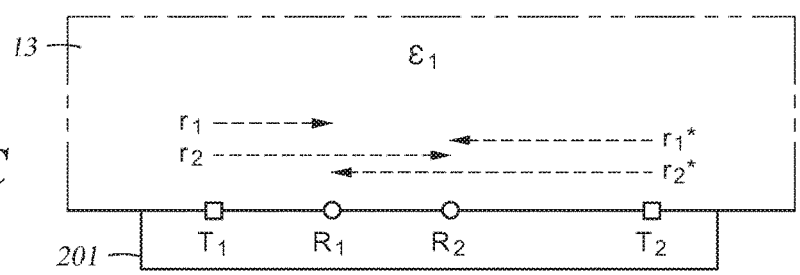
FIG. 2C shows the approximate effect of heterogeneous media on the propagation of an electromagnetic wave.

FIG. 2C shows the approximate effect of heterogeneous media on the propagation of an electromagnetic wave. Referring to FIGS. 2B-2C, although $r_2-r_1=r^*_2-r^*_1$, $r_2 \neq r^*_2$ and $r_1 \neq r^*_1$; thus, the "simulated" distances between transmitter and receivers from the left and right are not equal. This leads to an unequal phase shift for an electromagnetic wave travelling from these transmitters, which renders the traditional approach invalid. This disclosure holds to the underlying assumptions on compensated measurement.

Figure 2D:
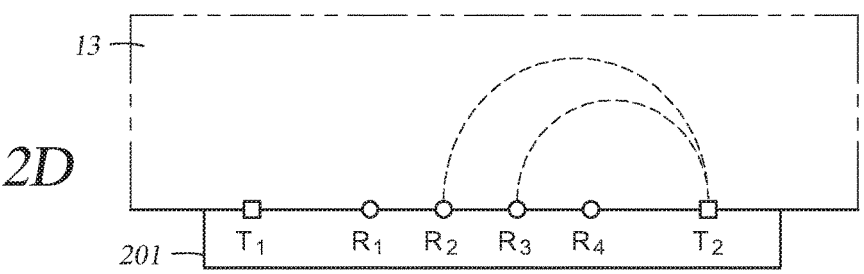
FIGS. 2D-2E shows the phase shifts of a wave propagation tool according to embodiments of the present disclosure.

FIG. 2D shows the phase shifts of wave propagation tool 207 according to embodiments of the present disclosure. Tool 207 may include transmitters T1, T2 and receivers R1-R4. The transmitters T1, T2 may be symmetrically arranged with the receivers R1-R4. For example, the distance from T1 to R1 may be equal to the distance from T2 to R4; and the distance from T1 to R2 may be equal to the distance from T2 to R3.

Referring to FIG. 2D, to obtain the phase difference between receivers R2 and R3, the symmetrical transmitters are used to cancel the effect of phase shift on each receiver. Upon firing transmitter T1, the phase shifts at R2 and R3 may be expressed as:

$$\theta_{R_3}^{T1}=\theta_{T_1R_3}-\theta_{R_3}^{sh} \quad (5)$$

$$\theta_{R_2}^{T1}=\theta_{T_1R_2}-\theta_{R_2}^{sh} \quad (6)$$

where $\theta_{R_j}^{T_i}$ is the phase shift recorded at receiver j when transmitter i is fired, $\theta_{T_iR_j}$ is representative of the time the EM wave propagates in the formation, $\theta_{R_j}^{sh}$ is the internal value of the phase shift at receiver j. The relative phase shift between receivers R2 and R3 after firing transmitter T1 (i.e., $\theta_{R_2}^{T1}-\theta_{R_3}^{T1}$) may be expressed as:

$$\theta_{R_2R_3}^{T1}=\theta_{T_1R_2}+\theta_{R_2}^{sh}-\theta_{T_1R_3}-\theta_{R_3}^{sh} \quad (7)$$

Upon firing transmitter T2, the phase shifts at R2 and R3 may be expressed as:

$$\theta_{R_3}^{T2}=\theta_{T_2R_3}-\theta_{R_3}^{sh} \quad (8)$$

$$\theta_{R_2}^{T2}=\theta_{T_2R_2}-\theta_{R_2}^{sh} \quad (9)$$

The relative phase shift between receivers R3 and R2 after firing transmitter T2 may be expressed as $(\theta_{R_3}^{T2}-\theta_{R_2}^{T2})$:

$$\theta_{R_3R_2}^{T2}=\theta_{T_2R_3}+\theta_{R_3}^{sh}-\theta_{T_2R_2}-\theta_{R_2}^{sh} \quad (10)$$

Conventionally, it may be assumed that these phase shifts are equal:

$$\theta_{T_2R_2}=\theta_{T_1R_3}, \theta_{T_2R_3}=\theta_{T_1R_2} \quad (11)$$

After substituting $\theta_{T_1R_2}$ and $\theta_{T_1R_3}$ into Eq. (10), the relative phase shift between receivers R3 and R2 after firing transmitter T2 (i.e., $\theta_{R_3}^{T2}-\theta_{R_2}^{T2}$) may be given by:

$$\theta_{R_3R_2}^{T2}=\theta_{T_1R_2}+\theta_{R_3}^{sh}-\theta_{T_1R_3}-\theta_{R_2}^{sh} \quad (12)$$

Thus, a compensated measurement for the relative phase between receivers R3 and R2 may be given as:

$$\theta_{R_2R_3}^{com} = \frac{(\theta_{R_2R_3}^{T_1} + \theta_{R_3R_2}^{T_2})}{2} \quad (13)$$

$$\theta_{R_2R_3}^{com}=\theta_{T_1R_2}-\theta_{T_1R_3} \quad (14)$$

The compensated measurement as described according to FIGS. 2A-2E may fail to provide correct estimation of the relative phase between receivers. This is the case in an unsynchronized phase measurement when origin of time for traveling wave is unknown hence the phase measured by the receivers is restricted to one cycle (for example $0<\theta<2\pi$ or $-\pi<\theta<\pi$). In such cases that the combined phase due to wave traveling in the medium and internal phase shift of transmitter and receiver [Eq. 4] results in a value greater than one cycle, the phase that is read by the receiver is folded back into the one cycle range. This may lead to erroneous phase calculation by compensated phase measurement.

In order to take into account the effect of phase wrapping (a phase shift greater than $2\pi$ radians or 360°), Eq. 4 may be modified as below:

$$\theta^*_{R_j}{}^{T_i}=\theta_{T_i}+\theta_{R_j}+\theta(r)-2m_{ij}\pi=\theta_{R_j}^{T_i}-2m_{ij}\pi \quad (5)$$

where $\theta^*$ represents a phase measurement confined to one cycle and m represents the number of phase wrappings. This leads to the following modification of Equations 1 through 3:

$$\theta^*_{R_1R_2}{}^{T1}=\theta_{R_2}^{T1}-2m_{12}\pi-\theta_{R_1}^{T1}+2m_{11}\pi \quad (6)$$

$$\theta^*_{R_1R_2}{}^{T2}=\theta_{R_1}^{T2}-2m_{21}\pi-\theta_{R_2}^{T2}+2m_{22}\pi \quad (7)$$

$$\theta^*_{R_1R_2}=0.5(\theta^*_{R_1R_2}{}^{T1}+\theta^*_{R_1R_2}{}^{T2})=\theta_{R_1R_2}+K\pi \quad (8)$$

where $K=-m_{12}+m_{11}-m_{21}+m_{22}$. It is evident that the phase measurement can be in general wrong by multiples of $\pi$. This is further illustrated in the detailed example below.

Figure 2E:
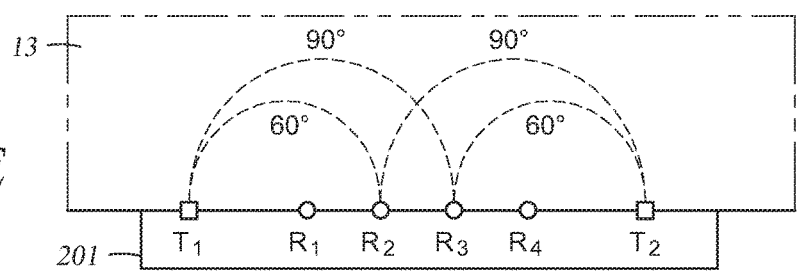

FIG. 2E shows the phase shifts of a wave propagation tool according to embodiments of the present disclosure. In this example, receivers R1, R3, and R4 have no internal phase shifts (i.e., $\theta_{R_1}^{sh}=0$, $\theta_{R_3}^{sh}=0$, $\theta_{R_4}^{sh}=0$); and receiver R2 has an internal phase shift of about 290° (i.e., $\theta_{R_2}^{sh}=290$). From inspection it can be seen that the actual phase difference is 330 degrees (60−90=−30, which is equivalent to 330). Filing in the appropriate values for the equations above, it can be seen that conventionally $\theta R3T1 = \theta T1R3 + \theta R3sh = 90+0 = 90$ $\theta R2T1 = \theta T1R2 + \theta R2sh = 60+290 = 350$ and thus, $\theta T1_{R_2R_3} = 350 - 90 = 260.$ Similarly, $\theta R3T2 = \theta T2R3 + \theta R3sh = 60+0 = 60$ $\theta R2T2 = \theta T2R2 + \theta R2sh = 90+290 = 380$ (which becomes 20)

and thus, $\theta T2_{R_3R_2} = 60 - 20 = 40$ and $\theta R2R3com = 0.5(\theta T1_{R_2R_3} + \theta T2_{R_3R_2}) = 0.5(260+40) = 150,$ thus providing a difference of 180 degrees between the calculated and the actual phase.

Figure 2F:
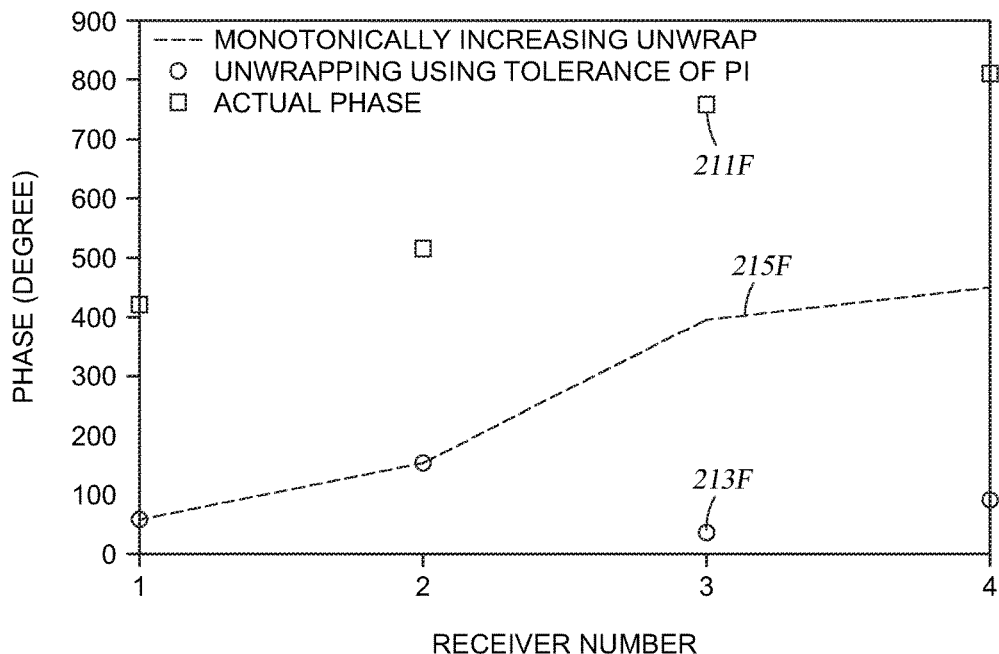
FIGS. 2F-2G show charts depicting the phase measurements depending on the number of receivers and frequency.
Figure 2G:
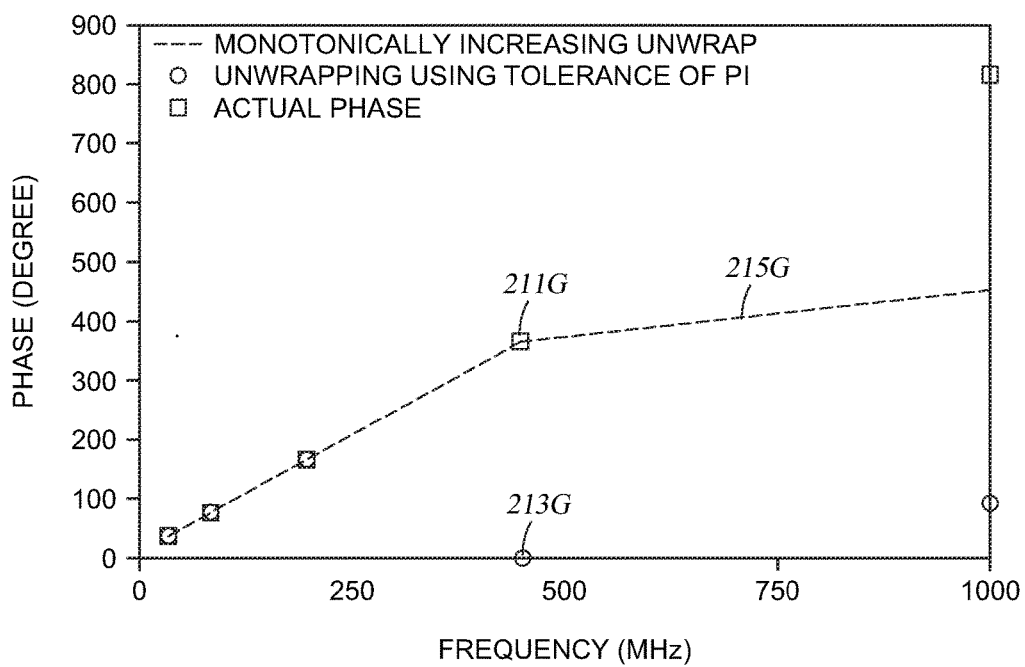

FIG. 2F shows a chart depicting compensated phase measurements depending on the number of receivers. FIG. 2G shows a chart depicting compensated phase measurements depending on the frequency. It is evident that where K is an odd number the conventional results are off by π. Table 1 below shows this error in greater detail.

It should be noted that relative phase between receivers is not only a function of the distance of receivers with respect to transmitter and each other but it also depends on the property of probed medium. So, ideally the dimensions of the phase measurement blocks should be specified taking into consideration the range of medium properties that the probe is intended to be used for. In particular embodiments, r may be approximately one (1) inch, or approximately 2.5 centimeters.

Other aspects include methods of using the tool above and processing signals received by the receivers of the tool to mitigate effects of phase shift while increasing accuracy and precision in measurements and improving estimates of parameters of interest of the earth formation.

As this tool is configured, the expected range for the compensated measurement between R2 and R3 is less than 180 degrees, as shown for the frequency range of the tool and all possible properties of a formation within which this tool may be deployed, as discussed in further detail below with respect to FIGS. 7A-11I.

Values obtained from compensated measurement (Eq. 3) may be corrected as follows:

$\theta_{R_1R_2 corrected} = \theta_{R_1R_2}$ if $0 \le \theta_{R_1R_2} \le \pi$ $\theta_{R_1R_2 corrected} = \theta_{R_1R_2} - \pi$ if $\pi < \theta_{R_1R_2} < 2\pi$ The corrected value represents the relative phase attributable to the volume of interest adjacent the measurement block between the two adjacent receivers.

Virtually combining the relative phase from a series of phase measurement blocks may be carried out to obtain a relative phase for larger distances, by processing signals from the array of receivers according to embodiments described in greater detail below. Note that in the case

TABLE 1

| $\theta_{T1}$ | $\theta_{T2}$ | $\theta_{R1}$ | $\theta_{R2}$ | $\theta(r_{T1R1}) = \theta(r_{T2R2})$ | $\theta(r_{T1R2}) = \theta(r_{T2R1})$ | $\theta_{R_1R_2}*T_1$ | $\theta_{R_1R_2}*T_2$ | $\theta_{R_1R_2}^{Traditional\ method}$ | $\theta_{R_1R_2}^{actual}$ |
|---|---|---|---|---|---|---|---|---|---|
| 2 | 8 | 2 | 2 | 17 | 22 | 11 | 359 | 185 | 5 |
| 48 | 18 | 10 | 48 | 198 | 264 | 104 | 28 | 66 | 66 |
| 15 | 114 | 9 | 171 | 87 | 116 | 191 | 227 | 209 | 29 |

Phase Measurement Block Approach

Aspects of the disclosure include techniques employing a tool wherein the position of transmitters and receivers are selected in such a way that the relative phase between transmitter and receivers is less than π. General embodiments of the present disclosure include a tool comprising a carrier having associated therewith (e.g., mounted on, or incorporated in) at least one upper transmitter, at least one lower transmitter, and an array of receivers responsive to EM signals generated by the transmitters between the upper transmitter(s) and the lower transmitter(s).

The plurality of receivers may be spaced apart at distances at most one half of the lowest wavelength of the received signal. Any two adjacent receivers from the array at a distance r that ensures the relative phase of a received signal wave to be less than π may be employed as a phase measurement block. The signals from the adjacent receivers of the measurement block may then be used to represent the phase shift of the volume of interest adjacent the block or otherwise processed according to the algorithm herein for use in estimating properties of the formation.

above, the distance between R1 and R4 (approximately 3 inches) may lead to a phase difference of greater than 180 degrees.

Given that $\theta R1R4com = \theta R1R2com + \theta R2R3com + \theta R3R4com$ a symmetric phase shift results in $\theta R1R2com=0.5(\theta T1R1R2+\theta T2R4R3)$, but this inapplicable with the present non-symmetrical approach.

However, $$\theta R1R4com = 0.5(\theta R4T1 - \theta R1T1) + 0.5(\theta R1T2 - \theta R4T2) ==$$
$$0.5(\theta R4T1 - \theta R3T1 + \theta R3T1 - \theta R2T1 + \theta R2T1 - \theta R1T1) +$$
$$0.5(\theta R1T2 - \theta R2T2 + \theta R2T2 - \theta R3T2 + \theta R3T2 - \theta R4T2) ==$$
$$0.5(\theta R4T1 - \theta R3T1) + 0.5(\theta R3T2 - \theta R4T2) +$$
$$0.5(\theta R3T1 - \theta R2T1) + 0.5(\theta R2T2 - \theta R3T2) +$$
$$0.5(\theta R2T1 - \theta R1T1) + 0.5(\theta R1T2 - \theta R2T2) ==$$

-continued $$0.5(\theta R3R4T1) + 0.5(\theta R4R3T2) + 0.5(\theta R2R3T1) +$$
$$0.5(\theta R3R2T2) + 0.5(\theta R1R2T1) + 0.5(\theta R2R1T2) =$$
$$0.5(\theta R3R4T1 + \theta R4R3T2) + 0.5(\theta R2R3T1 + \theta R3R2T2) +$$
$$0.5(\theta R1R2T1 + \theta R2R1T2) = \theta R3R4Aux + \theta R2R3Aux + \theta R1R2Aux$$

Thus, we define auxiliary compensated parameters (for example, θRxRyAux, where x and y are receiver identifiers, e.g., θR3R4Aux). These auxiliary compensated parameters, or measurement block compensated shift parameters, are estimated by using a first relative phase value (e.g., $\theta T1_{R_3R_4}$) comprising a measured phase shift between signals received at a first receiver of the adjacent pair of receivers and signals received at a second receiver responsive to excitation of the upper transmitter; and a second relative phase value (e.g., $\theta T2_{R_4R_3}$) comprising a measured phase shift between signals received at a second receiver of the adjacent pair of receivers and signals received at a first receiver responsive to excitation of the lower transmitter; in the example above, θR3R4Aux=0.5 ($\theta T1_{R_3R_4}+\theta T2_{R_4R_3}$). Note that alternative notation may be used herein to describe relative phase values; for example, θR3R4T1 is equivalent to $\theta T1_{R_3R_4}$. Thus, the phase shift for a volume of interest corresponding to a segment of the array can be obtained by estimating the auxiliary compensated parameter for a set of concatenated phase measurement blocks forming the segment.

Several advantages occur as a result of the techniques of the present disclosure. The method does not require knowledge of the phase shift at each receiver or transmitter, and thus no calibration is required. The implicit internal electronic equipment phase shift errors within a transmitter or receiver can have arbitrary values independent from the formation material properties (i.e. conductivity sigma and dielectric constant). The implicit internal electronic equipment phase shift errors within a transmitter or receiver can be compensated for becoming temperature and pressure independent (e.g., environmentally desensitized to pressure, temperature, sensor stresses, electronics drifts) provided these phase errors are sufficiently constant and stable for all measurements made within the same frequency for each transmitter and receiver pair at each observation depth along the borehole well. These implicit internal electronic equipment phase shift errors within a transmitter or receiver are not internally observed nor measured by an instrumentation's internal electronics hardware phase synchronization references. The present methodology makes this instrumentation measurement more robust, improves data quality and integrity, and makes instruments simpler to operate requiring no extra measurements and calibrations to address internal phase noise uncertainties. Since this method is independent of the phase shift at each receiver, it is also independent of temperature variation. The actual phase difference between receivers is identified. As a result, it is unnecessary to make the phase shift at all receivers equal, which at high frequencies of operation (for example, 1 GHz) can be problematic.

Methods of the present disclosure include increasing the robustness of the phase measurement to noise by identifying the lower limit of the phase measurement based on distance between receivers, frequency of operation, and the range of formation properties. The lower limit of phase may be used to modify the allowable range of phase measurement, and may be used to provide enough room for noise and avoid unnecessary correction.

Techniques in accordance with embodiment of the present disclosure as described herein may be employed in connection with a variety of downhole tools conveyed on various carriers. Several general examples are described hereinbelow.

FIG. 3A shows downhole logging tool (downhole tool, logging tool, multi-frequency dielectric array logging tool, electromagnetic tool, dielectric tool, or tool) 300 for evaluating an earth formation according to embodiments of the present disclosure. The dielectric tool 300 may be disposed on carrier 11 (not shown) intersecting the earth formation 13. The dielectric tool 300 may include a body (e.g., BHA, housing, enclosure, drill string, wireline tool body) 301 having pads 305 extended on extension devices 303. Two pads are shown for illustrative purposes and, in actual practice, there may be more or fewer pads, such as three pads separated by about 120 degrees circumferentially or six pads separated by about 60 degrees. The extension devices 305 may be electrically operated, electromechanically operated, mechanically operated or hydraulically operated. With the extension devices 303 fully extended, the pads (dielectric tool pads) 305 may engage the borehole 12 and make measurements indicative of at least one parameter of interest of the earth formation, such as (i) a water saturation of the formation, (ii) a water conductivity of the formation, (iii) a relative permittivity of the formation, (iv) a permittivity of rock matrix, (v) a complex permittivity of mudcake, (vi) a thickness of the mudcake, (vii) a texture of the rock, (viii) cementation exponent, (ix) saturation exponent, (x) cation exchange capacity, and (xi) a relative phase shift, (xii) a relative amplitude.

Pads 305 may include a face configured to engage the borehole 12. The term "engage," as used herein, may be defined as in contact with the borehole 12, urged against the borehole 12, pressed firmly against the borehole 12, or positioned proximate the borehole 12. The term "proximate," as used herein, may be defined as the pad being near the borehole 12 such that measurements may be taken from the pad that are useful in evaluating the borehole, earth formation, or both. The term "face" refers to the surface, edge, or side of the tool body or pad that is closest to the borehole wall.

Pads 305 may include transmitter T1, T2 and receivers R1, R2. The transmitters may be configured to radiate EM waves into the formation; and the receivers may be configured to be responsive to the EM waves radiating in the formation and generate a signal that is indicative of the parameter of interest (e.g., phase shift, amplitude, water saturation, water conductivity, or permittivity of the formation, salinity). A processor may be configured to estimate the amplitude attenuation and phase difference between the transmitted signal and the received signals, which are used to estimate the parameter of interest. As an example, the attenuation and phase difference may be estimated between the received signals from at least two spaced receivers. This processing may be done downhole or at the surface, by using one or more processors (e.g., information processing system 1200 of FIG. 12).

FIG. 3B shows a cross-sectional view of multi-frequency dielectric logging tool 300b in accordance with embodiments of the present disclosure. Dielectric tool 300b may include tool body 301 having transmitters T1, T2 and receivers R1-R4 disposed on tool body 301. In other embodiments, the transmitter-receiver configuration of logging tool 300b may be included on pads 305.

FIG. 3C shows a cross-sectional view of multi-frequency dielectric logging tool in accordance with embodiments of the present disclosure. Dielectric tool 300c may include tool body 301 having transmitters T1-T6 and receivers R1-R4 disposed on tool body 301. In other embodiments, the transmitter-receiver configuration of logging tool 300c may be included on pads 305.

Referring to FIGS. 3A-3C, the transmitters may be positioned symmetrically on pads 305 or tool body 301 with respect to the receivers on dielectric tools 300, 300b, and 300c. For example, on dielectric tool 300b, the distance from T1 to R3 may be the same distance as from T2 to R2; and the distance from T1 to R1 may be the same distance as from T2 to R4. In addition, each receiver may have a spacing from its adjacent receiver such that an EM wave propagating between those receivers travels at most one half wavelength (i.e., the propagation of EM waves between each adjacent receiver has a phase shift that is no greater than $\pi$ radians or 180° due to the formation and not taking into account internal phase shifts of the tool circuitry). Also, the spacing between R1 and R2 may not exceed one half wavelength of the EM wave propagating in formation 13. The spacing between adjacent receivers may depend on the frequency range of the dielectric tool.

As non-limiting examples, each transmitter or receiver of the multi-frequency dielectric array logging tool may be configured as a loop antenna, a coil antenna, a monopole antenna, a dipole antenna, an antenna array, a patch antenna, a reflector antenna, a log-periodic antenna, etc. Each transmitter or receiver may be configured to operate at a plurality of frequencies. Each transmitter or receiver may be configured to have a limited frequency range and tuned to discrete frequencies separated by at least 50 MHz.

In one example, the tool may be a dielectric probe. Data from a dielectric probe is used in this example where the attenuation and phase shift of electromagnetic wave propagating in a formation with unknown properties is used to obtain information on various components present within it (e.g., solid matrix, water, and oil). Due to large contrast between permittivity and conductivity of water and the other components present in formation, this probe may be used for identifying the volume fraction of water ($S_W$) and its salinity ($R_W$).

The probe may use only a few frequencies. As an example, each transmitter or receiver may be configured to operate at a frequency range from about 35 MHz to about 1 GHz and tuned to only these discrete frequencies 35 MHz, 84 MHz, 200 MHz, 450 MHz, and 1000 MHz. Thus, each transmitter or receiver may be configured to have a bandwidth of about 1 GHz and tuned to a plurality of frequencies within that frequency band, and each tuned frequency within that band may be separated by at least 50 MHz.

As will be recognized with respect to FIGS. 11A-11I (below), the range of phase shift stays within the acceptable range for the smallest distance between receivers (1 in) at the highest frequency of operation (1 GHz) is shown for all practical possible properties of formation. Hence, the proposed method can be used for the probe in identifying the correct phase.

Figure 3D:
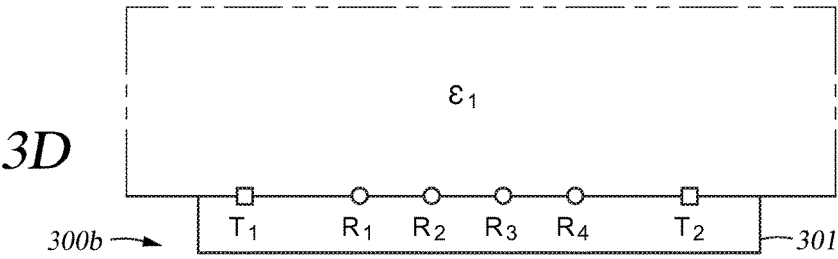
FIG. 3D shows an array of transmitters and receivers spanning the volume of interest in accordance with embodiments of the present disclosure.

FIG. 3D shows an array of transmitters and receivers on tool 300b spanning the volume of interest in accordance with embodiments of the present disclosure. In order to calculate the phase difference between receivers R1 and R4 the following approach may be taken by expressing Eq. (1) and (2) as:

$$\theta^*_{R_1R_4}{}^{T_i}=\theta^*_{R_1R_2}{}^{T_i}+\theta^*_{R_2R_3}{}^{T_i}+\theta^*_{R_3R_4}{}^{T_i}, \text{ where } i=1,2 \quad (19)$$

The corrected relative phase between receivers R1 and R4 may be given by:

$$\theta_{R_1R_4}=\bar{\theta}_{R_1R_2}{}^{corrected}+\bar{\theta}_{R_2R_3}{}^{corrected}+\bar{\theta}_{R_3R_4}{}^{corrected} \quad (20)$$

$$\bar{\theta}_{R_iR_j}{}^{corrected}=\bar{\theta}_{R_iR_j} \text{ if } \alpha\leq\bar{\theta}_{R_iR_j}\leq\alpha+\pi \quad (21)$$

$$\bar{\theta}_{R_iR_j}{}^{corrected}=\bar{\theta}_{R_iR_j}-\pi \text{ else} \quad (22)$$

where $\bar{\theta}$ is an auxiliary parameter that may be expressed as:

$$\bar{\theta}_{R_iR_j}=0.5(\theta^*_{R_iR_j}{}^{T_1}+\theta^*_{R_iR_j}{}^{T_2}) \quad (23)$$

and $\alpha$ is the lower limit for the range of phase that is chosen separately for each frequency based on the range of expected phase shifts to provide tolerance for noise and prevent unnecessary corrections.

It should be noticed that except $\bar{\theta}_{R_2R_3}=\theta_{R_2R_3}$ the other two terms are only auxiliary parameters and they are not equal to relative phase between indexed receivers as they are not symmetrically located between transmitters.

Figure 3E:
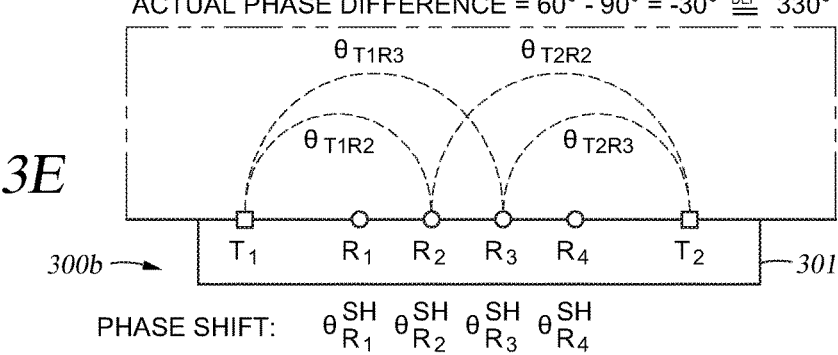
FIG. 3E shows the phase shifts in the medium and internal phase shifts in the tool in accordance with embodiments of the present disclosure.

FIG. 3E shows the phase shifts in the formation 13 and internal phase shifts in the tool 300b in accordance with embodiments of the present disclosure. The expected range for the compensated measurement between R2 and R3 is less than 180 degrees as shown for the frequency range of the tool and all possible properties of formation within which this tool may operate. As an example, the frequency range of the dielectric tool and the properties of the formation may be used in correcting the relative phase between R2 and R3 where the spacing between these receivers is 1 inch.

Figure 4A:
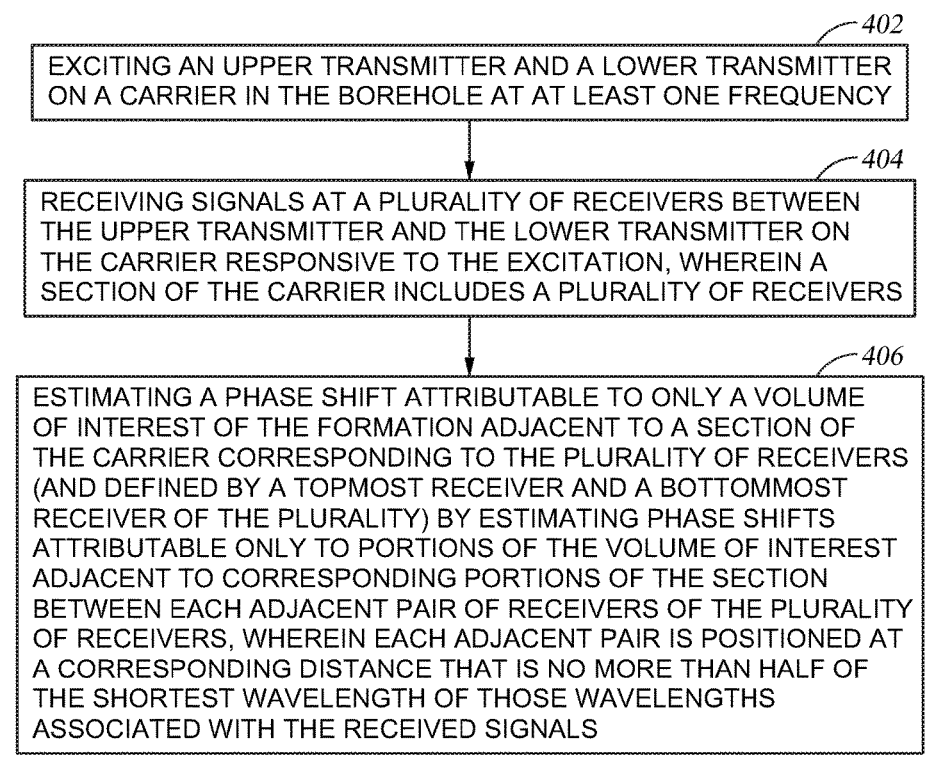
FIG. 4A shows a flow chart of method for evaluating an earth formation intersected by a borehole in accordance with embodiments of the present disclosure.

FIG. 4A shows a flow chart of method 400 for evaluating an earth formation intersected by a borehole in accordance with embodiments of the present disclosure. Step 402 includes exciting an upper transmitter and a lower transmitter on a carrier in the borehole at at least one frequency. Step 404 includes receiving signals at a plurality of receivers between the upper transmitter and the lower transmitter on the carrier responsive to the excitation, wherein a section of the carrier includes a plurality of receivers. Steps 402 and 404 may be carried out by using at least one processor to direct or control the transmitters directly, or by using commands to intermediate processors (e.g., controllers, DSPs, and the like) in operative connection with measurement circuitry including signal generators, amplifiers, power sources, data storage, etc. to generate and measure electromagnetic phenomena (e.g., a propagating wave).

Step 406 includes estimating a phase shift attributable to only a volume of interest of the formation adjacent to a section of the carrier corresponding to the plurality of receivers by estimating phase shifts attributable only to portions of the volume of interest adjacent to corresponding portions of the section between each adjacent pair of receivers of the plurality of receivers. The section of the carrier corresponding to the plurality of receivers may be defined by a topmost receiver and a bottommost receiver of the plurality. Each adjacent pair may be positioned at a corresponding distance that is no more than half of the shortest wavelength of those wavelengths associated with the received signals.

Other, optional, steps may include estimating a parameter of interest, evaluating the formation, or modeling the formation using the estimated phase shift attributable to the volume of interest. Other optional steps include conducting secondary recovery operations in dependence upon the estimated parameter, the model, location of a boundary, or combinations of these. Secondary recovery operations may include any or all of drilling operations, injection operations, production operations, and the like. For example, the method may include commencing, modifying, continuing, or halting one or more drilling or production operations in dependence upon a model of the formation characterizing particular volumes of interest as having particular properties (e.g., values of one or more parameters of interest).

Figure 4B:
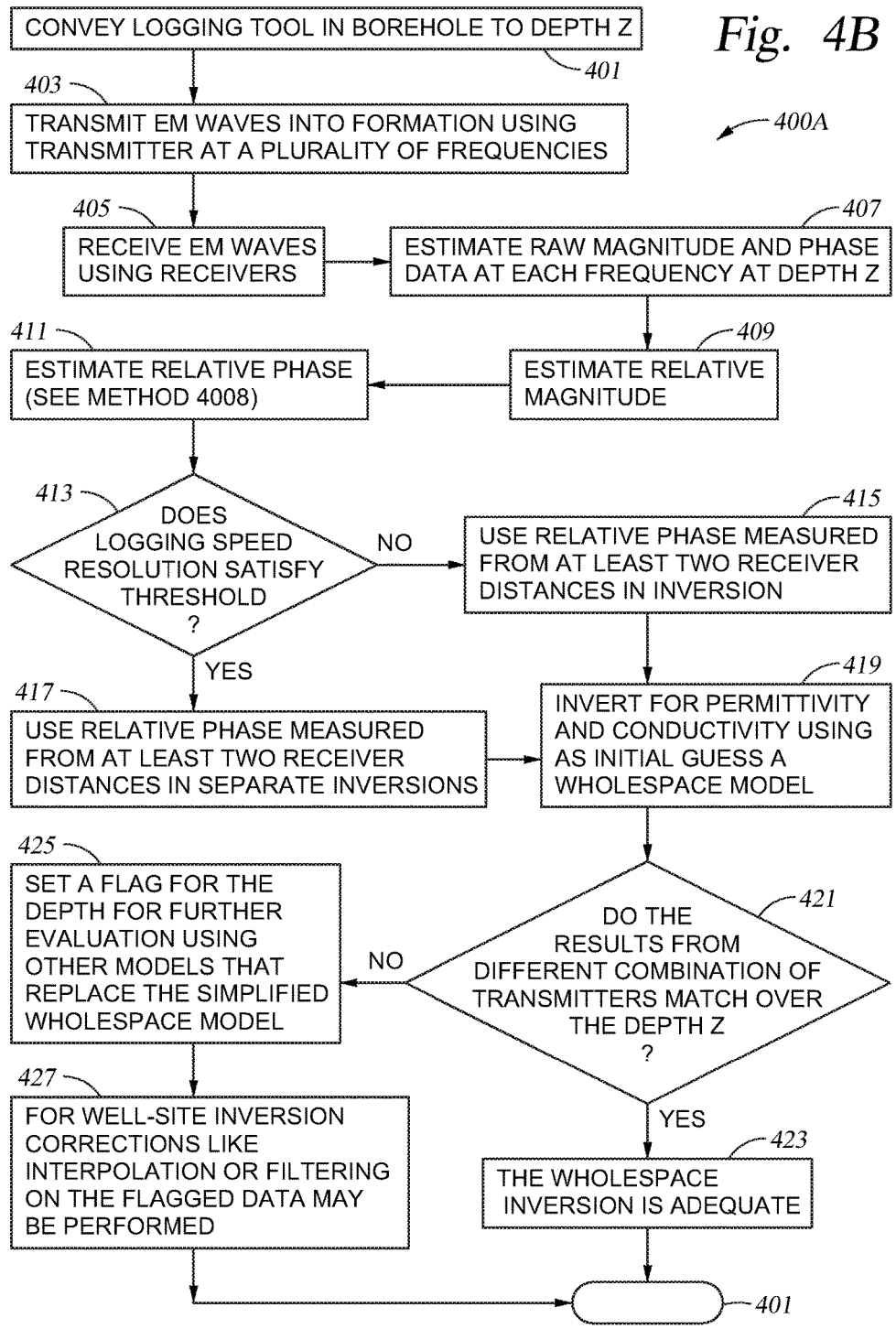
FIG. 4B shows a flow chart of a method for estimating at least one parameter of interest of the formation according to embodiments of the present disclosure.

FIG. 4B shows a flow chart of method 400A for estimating at least one parameter of interest according to embodiments of the present disclosure. Optional step 401 begins by conveying the logging tool in the borehole to a particular depth (z). The tool may be based on EM wave propagation, such as, for example a dielectric logging tool, an electromagnetic propagation tool, or the like. Alternatively, in other embodiments the tool may be based on standing waving generation. Optional step 403, wherein EM waves are transmitted into the formation using a plurality of transmitters (e.g., upper and lower transmitters) at a plurality of discrete frequencies. Optional step 405 comprises receiving EM waves at a receiver. This may include the occurrence of a signal on a receiver coil or the like of a current or voltage responsive to the generated propagating wave, detection of the current or voltage, and preprocessing by receiver circuitry, including, for example, one or more analog-to-digital converters, digital signal processors, and so on.

At step 407, at least one processor is used to estimate raw magnitude and phase data at each frequency at depth z by processing signals or other information from the receiver. At optional step 409, relative magnitude may be estimated using at least one processor, which may be same processor or a different processor. Step 411 comprises estimating relative phase, as described in further detail below with reference to FIG. 4C.

At step 413, a check is carried out to determine whether logging speed resolution satisfies a quality threshold. As a non-limiting example, the quality threshold may determine whether the logging speed resolution contains phase information for the receivers 1" apart. If resolution is too low, step 415 is carried out. In some instances, an array dielectric tool may be used (FIGS. 3A-3C). This tool may utilize several combinations of transmitter and receivers. Two examples from general embodiments include use where receivers are 1" apart (T1T6R2R3, T2T5R2R3,T3T4R2R3) and use where receivers are 3" apart (T1T6R1R4, T2T5R1R4,T3T4R1R4). Step 415 comprises using relative phase measured from at least two receiver distances in inversion (e.g., using both 1" and 3" measurements together for the inversion). If the resolution meets the threshold, step 417 is carried out. Step 417 comprises using a relative phase measured from at least two receiver distances in separate inversions (e.g., using both 1" and 3" measurements separately).

If the logging speed satisfies the resolution corresponding to the smallest measuring block (smallest distance between receivers) then the distance between middle receivers (R2 and R3) would traverse the distance between longest distance of receivers (R1 and R4) through different instances of measurement. The data collected through these measurements provide an alternative method for estimating the magnitude and phase of wave traveling through the formation in front of R1-R4 receivers. This information can be helpful in quality control and increasing the signal to noise ratio especially for highly conductive formation for the longest distance of receivers. In either case, inversion using the respective phase shift information is employed.

At step 419, the inversion may be carried out by inverting for permittivity and conductivity using a wholespace model as an initial guess. In the whole space inversion, first the synthetic tool response in an isotropic whole-space model, i.e., without horizontal or vertical boundaries, is calculated. The synthetic whole-space response is then compared with measured field data at each logging depth and the respective parameter values are adjusted to match the synthetic responses with the measured field responses. In performing the match, other drilling or measurement parameters (e.g., telemetry) may also be used as input parameters.

At step 421, a comparison is made between estimates for the different transmitter or receiver combinations for depth z. If the results are comparable, the wholespace inversion is adequate (423). If the results diverge, a flag is set for the current depth z signifying that further evaluation may be performed using more intensive models in the place of the simplified wholespace model (step 425). Alternatively, a method may be used for quality control of the data from different frequencies, relying not only on comparison between the data inverted at different spacings but also on the data inverted at different frequencies. Here, the inverted permittivity and conductivity should follow a general trend (permittivity should be non-increasing and conductivity should be non-decreasing as the frequency increases.) Those measurements outside the trend may be discarded or deprecated (e.g., by the use of a weighting algorithm) or flagged for additional or alternative processing. Optionally, at step 427, for well-site inversion, corrections like interpolation or filtering on the flagged data may be performed. After the steps above are completed, the tool may be moved in the borehole and the steps repeated beginning at (step 401) for a desired number of iterations.

Figure 4C:
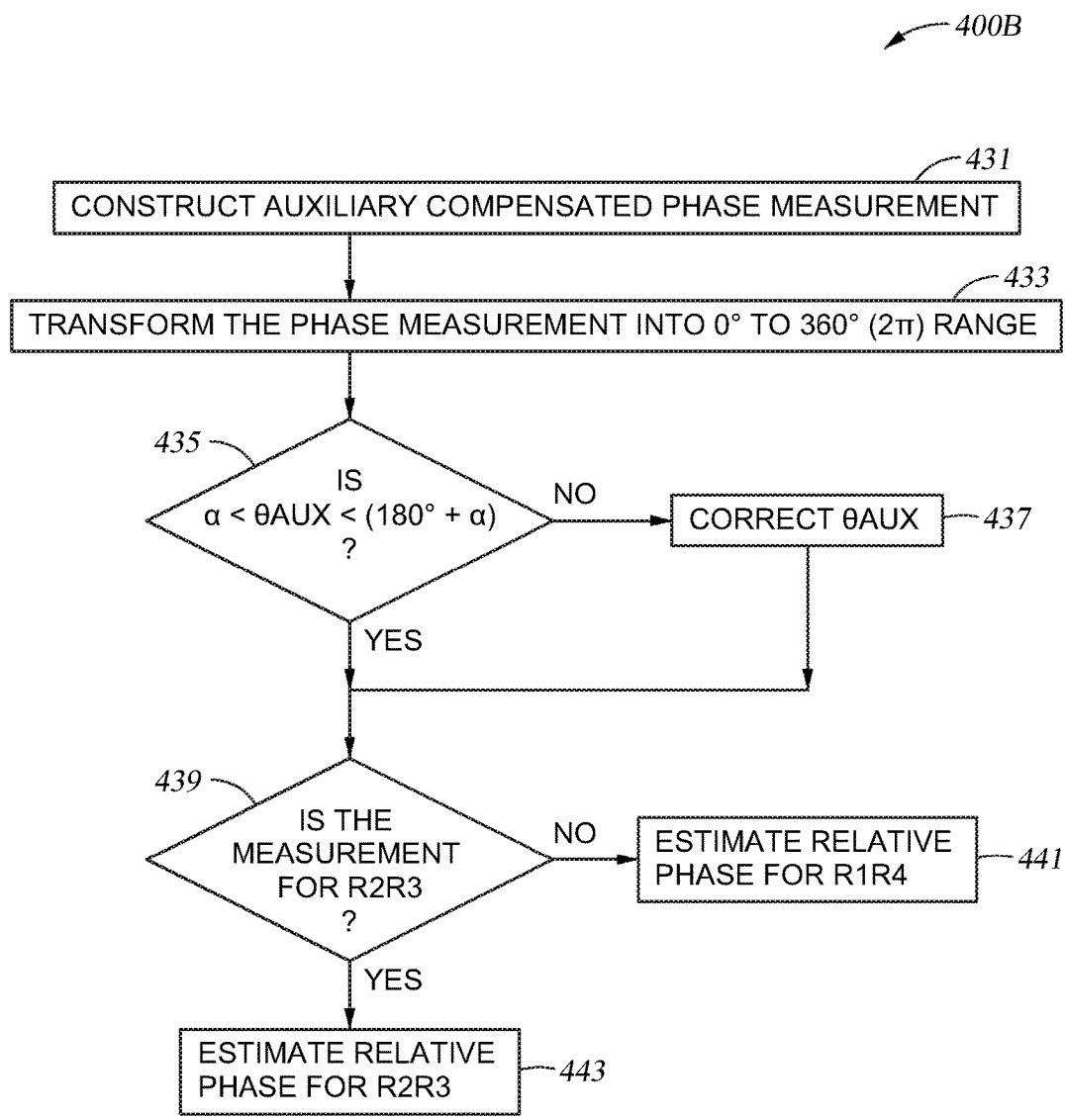
FIG. 4C shows a flow chart of a method for estimating the relative phase between two receivers in accordance with embodiments of the present disclosure.

FIG. 4C shows a flow chart of method 400B for estimating the relative phase between two receivers according to embodiments of the present disclosure. Step 431 of the method may be carried out by estimating an auxiliary compensated phase measurement, as described above. At step 433, this phase measurement may be transformed into a desired range, e.g., 0 to 360 degrees ($2\pi$), for example, if the phase is represented as a value between −180 and 180 then it can be transferred to the 0 to 360 range by adding 360 to the negative values. At step 435, the transformed phase measurement may be compared to smaller α-adjusted range, where α is a frequency based lower limit for the phase selected to avoid complications from phase oscillation around a true value (i.e., noise). Below 85 MHz, a may be −90 degrees. At around 200 MHz, a may be −70 degrees. From 400 to 500 MHz, α may be −30 degrees. Above 1 GHz, α may be 10 degrees. If the transformed phase measurement is not within the range (a to 180=α), the phase measurement is modified to be within the range (step 437). For example, the value may be modified by reducing by 180 degrees the calculated phase shifts for each of the portions of the volume of interest not within a range from a pre-determined lower limit to 180 degrees from the pre-determined lower limit.

If the phase measurement is for a center segment (e.g., R2-R3), the estimated value will correspond with the relative phase for the segment (step 443), and this value is returned (e.g., recorded, transmitted, or displayed). If the phase measurement is not for a center segment (e.g., R1-R4), the value is used in the calculations for estimating relative phase as described above (step 441), and this value is returned (e.g., recorded, transmitted, or displayed).

Test results below indicate the effectiveness of the techniques described herein. Examples of the application of the proposed method using a EM propagation tool are shown below. Actual final relative phase values may be compared between the traditional method and that of the present disclosure in Tables 2-5 below.

TABLE 2

Internal phase shifts of transmitter and receivers and contribution from medium

| $\theta_{T1}$ | $\theta_{T2}$ | $\theta_{R1}$ | $\theta_{R2}$ | $\theta_{R3}$ | $\theta_{R4}$ | $\theta(r_{T1R1}) = \theta(r_{T2R4})$ | $\theta(r_{T1R2}) = \theta(r_{T2R3})$ | $\theta(r_{T1R3}) = \theta(r_{T2R2})$ | $\theta(r_{T1R4}) = \theta(r_{T2R1})$ |
|---|---|---|---|---|---|---|---|---|---|
| 134 | 34 | 30 | 40 | 197 | 165 | 253 | 339 | 424 | 510 |
| 55 | 38 | 125 | 27 | 97 | 24 | 197 | 264 | 331 | 398 |

TABLE 3

Sensor readings

| $\theta_{R1}*^{T_1}$ | $\theta_{R2}*^{T_1}$ | $\theta_{R3}*^{T_1}$ | $\theta_{R4}*^{T_1}$ | $\theta_{R1}*^{T_2}$ | $\theta_{R2}*^{T_2}$ | $\theta_{R3}*^{T_2}$ | $\theta_{R4}*^{T_2}$ |
|---|---|---|---|---|---|---|---|
| 57 | 153 | 35 | 89 | 214 | 138 | 210 | 92 |
| 17 | 346 | 123 | 117 | 201 | 36 | 39 | 259 |

TABLE 4

Intermediate parameters for relative phase between receivers

| $\theta_{R1R2}*^{T_1}$ | $\theta_{R2R1}*^{T_2}$ | $\theta_{R2R3}*^{T_1}$ | $\theta_{R3R2}*^{T_2}$ | $\theta_{R3R4}*^{T_1}$ | $\theta_{R4R3}*^{T_2}$ | $\overline{\theta}_{R1R2}$ | $\overline{\theta}_{R2R3}$ | $\overline{\theta}_{R3R4}$ |
|---|---|---|---|---|---|---|---|---|
| 96 | 76 | 242 | 288 | 54 | 118 | 86 | 265 | 86 |
| 329 | 165 | 137 | 357 | 354 | 140 | 247 | 247 | 247 |

TABLE 5

Relative phase between receivers

| $\theta_{R2R3}^{Traditional\ method}$ | $\theta_{R2R3}^{Proposed\ method}$ | $\theta_{R2R3}^{actual}$ | $\theta_{R1R4}^{Traditional\ method}$ | $\theta_{R1R4}^{Proposed\ method}$ | $\theta_{R1R4}^{actual}$ |
|---|---|---|---|---|---|
| 265 | 85 | 85 | 437 | 257 | 257 |
| 247 | 67 | 67 | 741 | 201 | 201 |

Figure 5A:
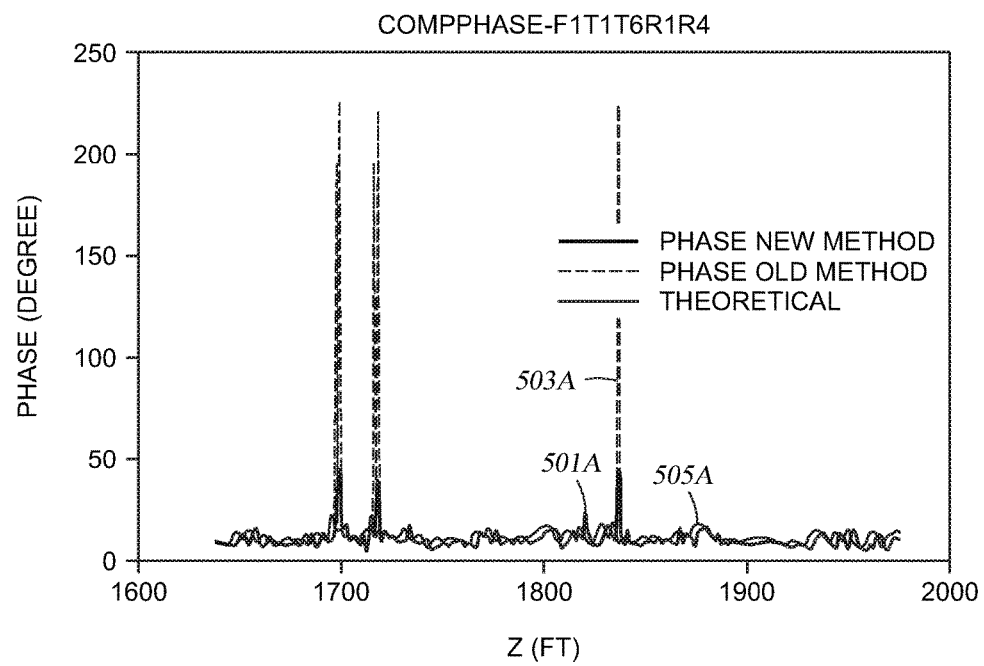
FIGS. 5A-5T show phase curves over the depth of a test well in accordance with embodiments of the present disclosure.
Figure 5B:
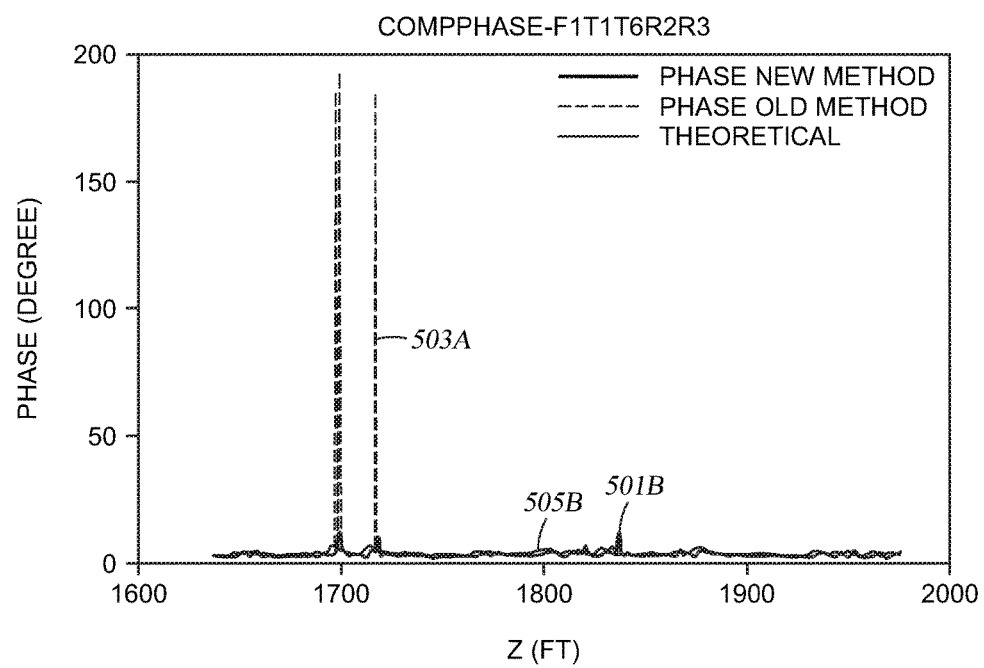
Figure 5C:
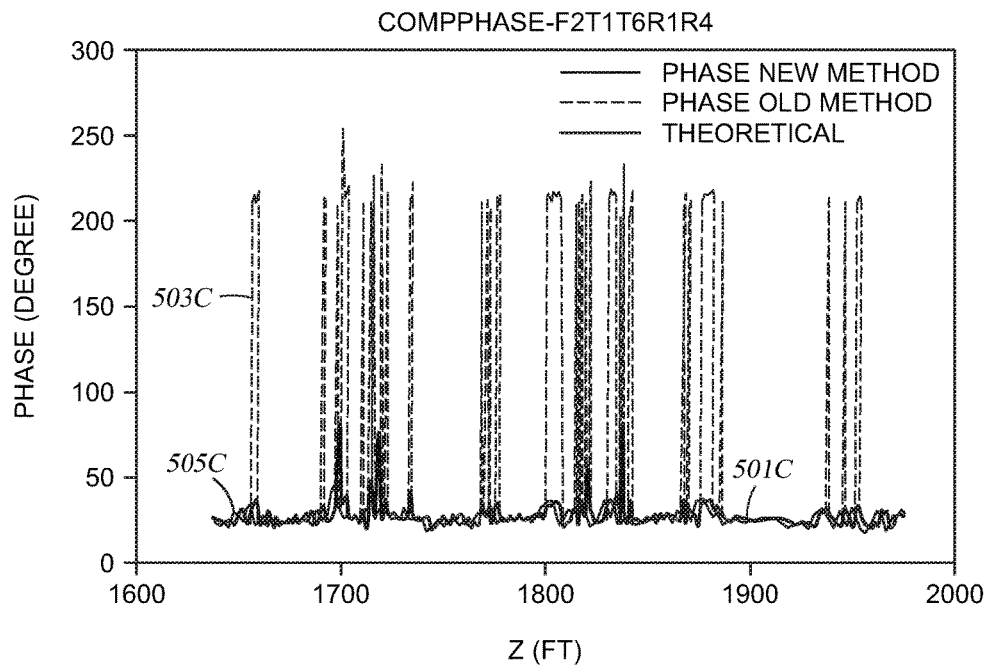
Figure 5D:
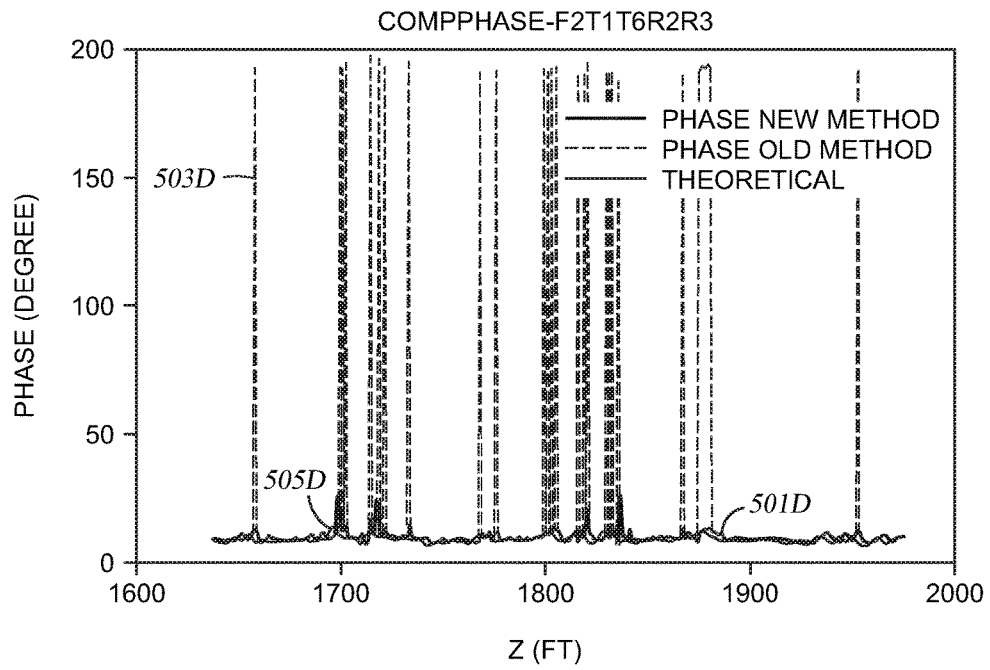
Figure 5E:
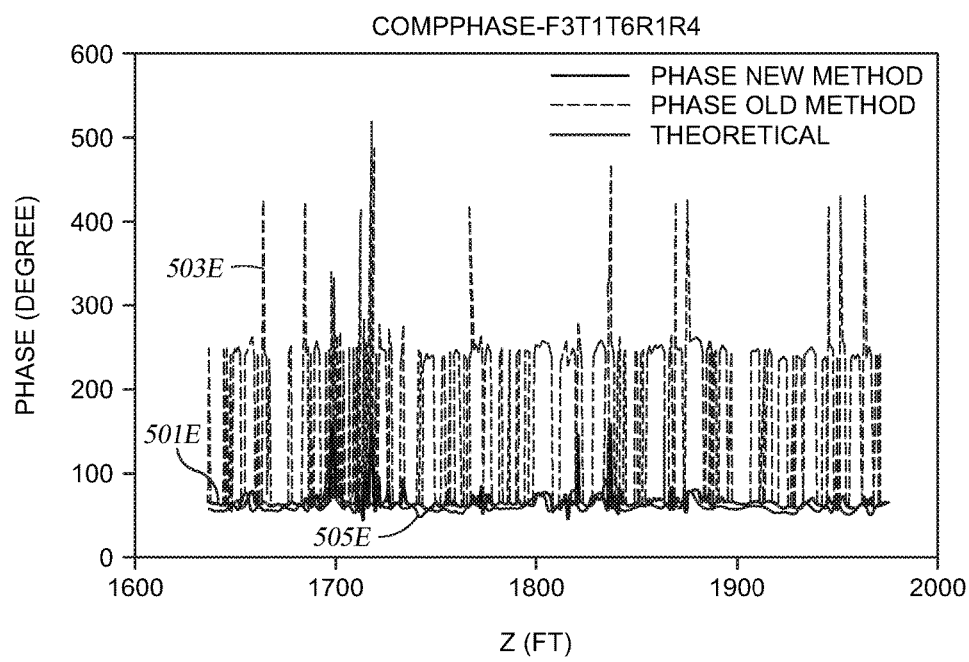
Figure 5F:
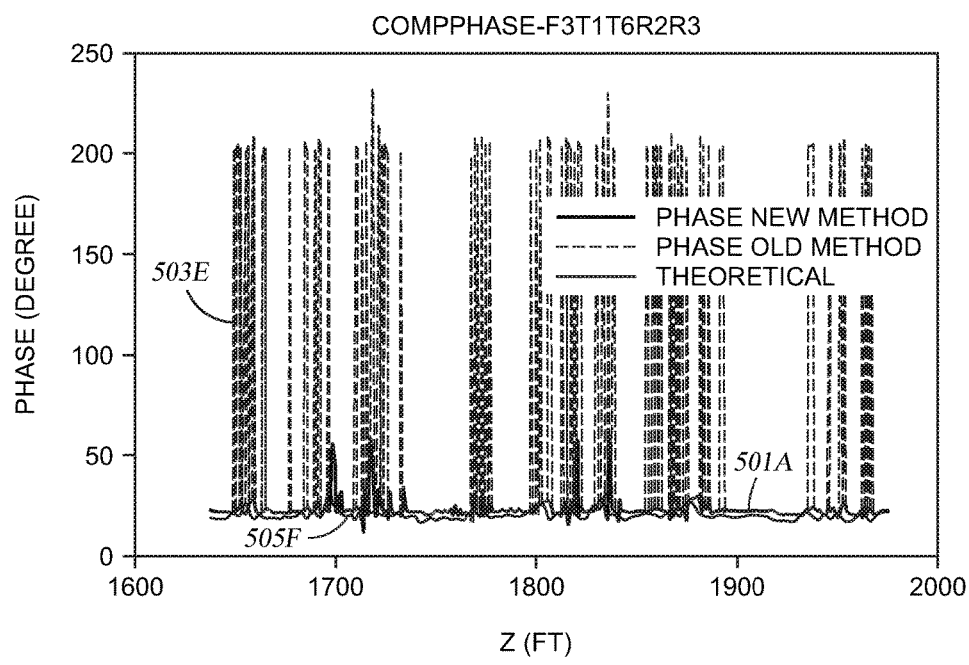
Figure 5G:
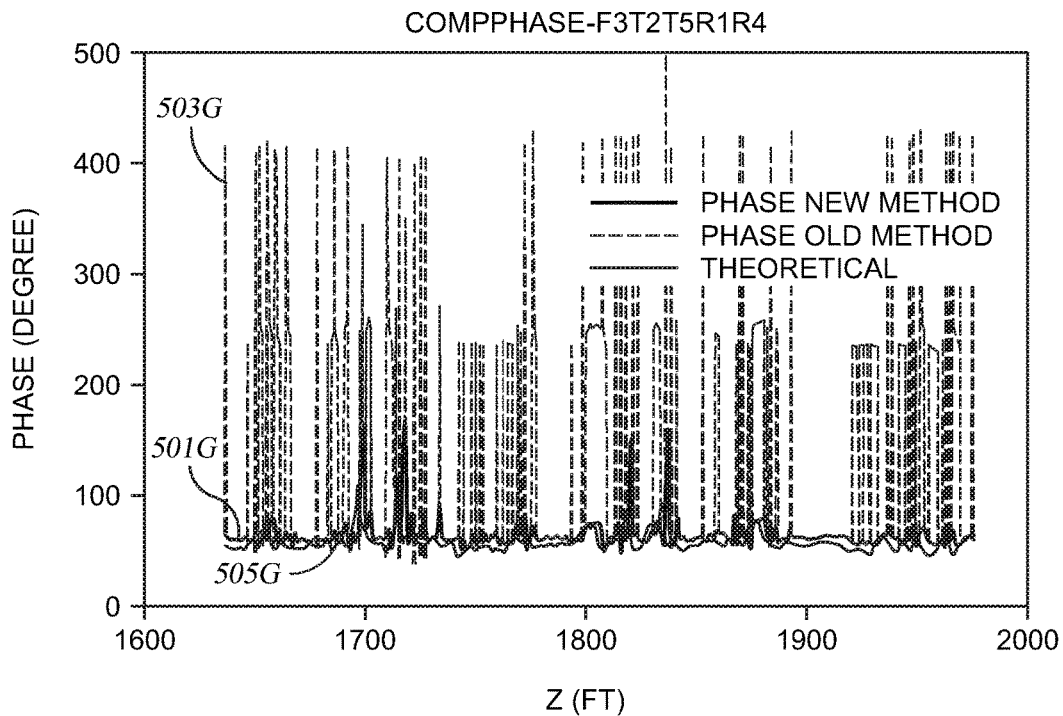
Figure 5H:
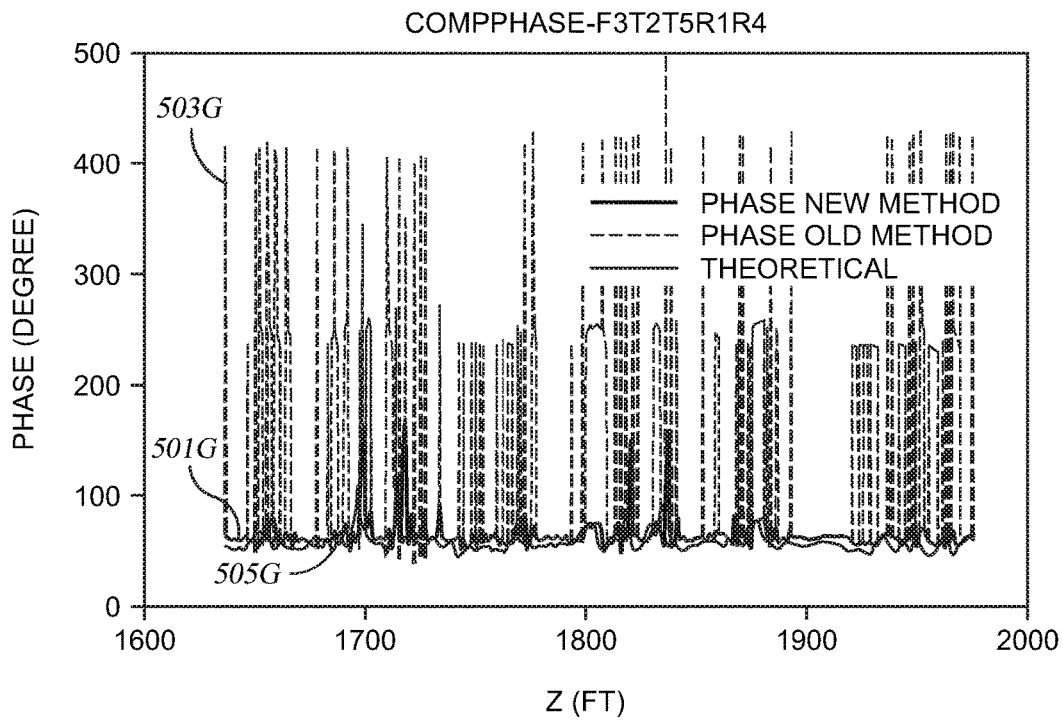
Figure 5I:
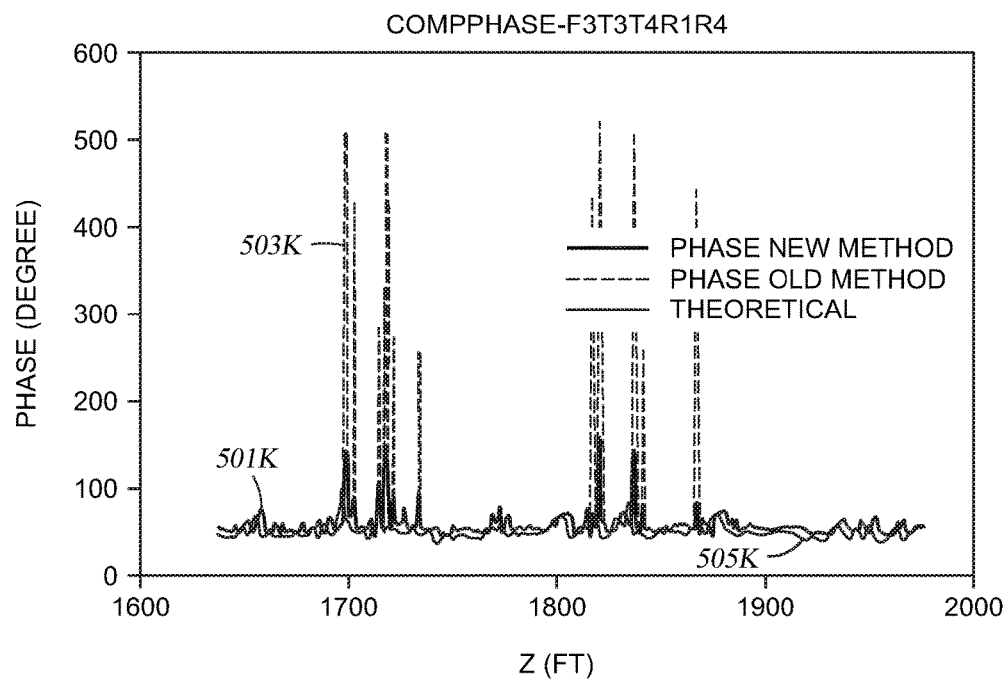
Figure 5J:
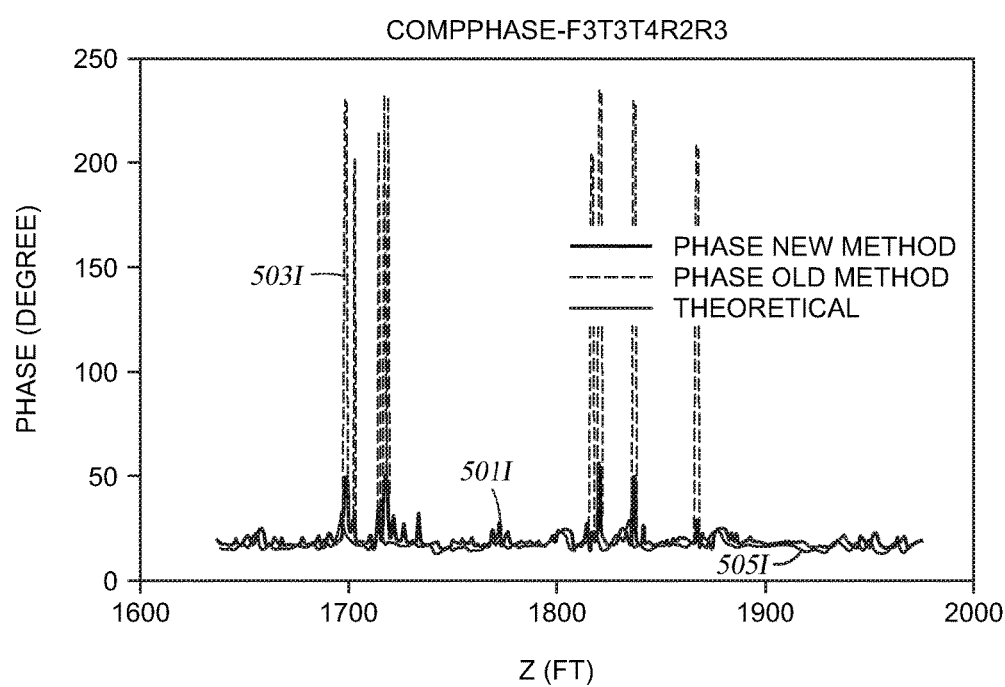
Figure 5K:
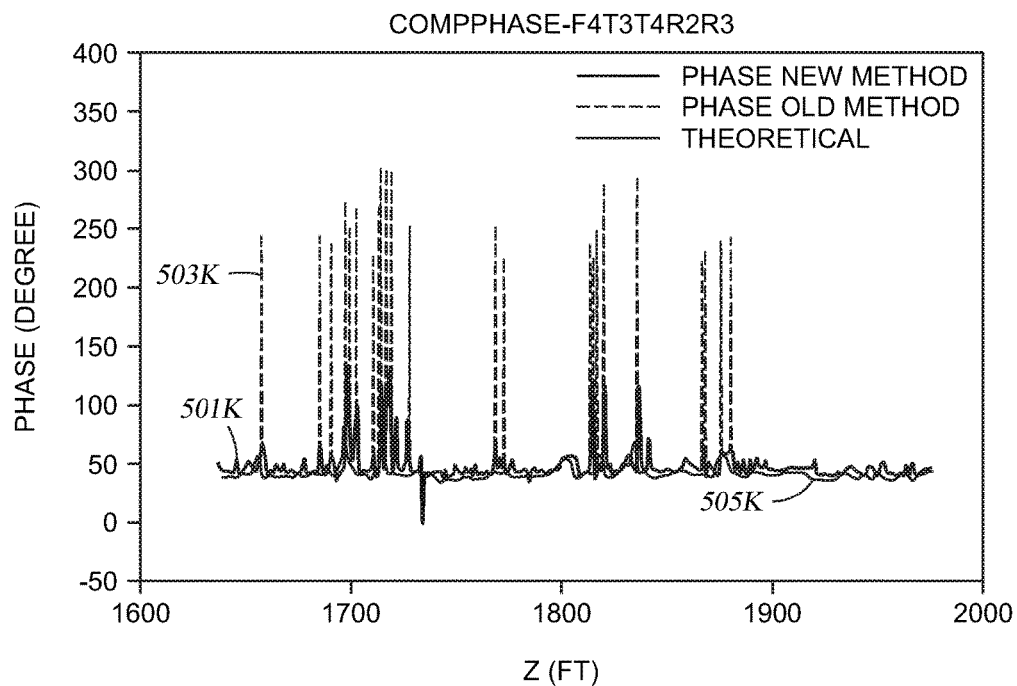
Figure 5L:
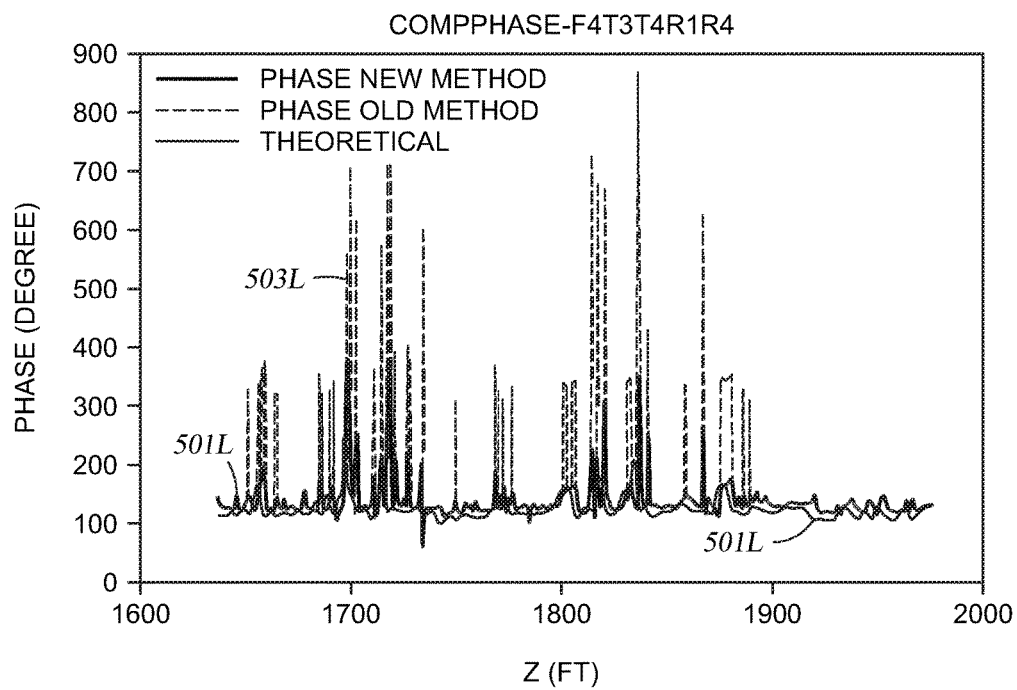
Figure 5M:
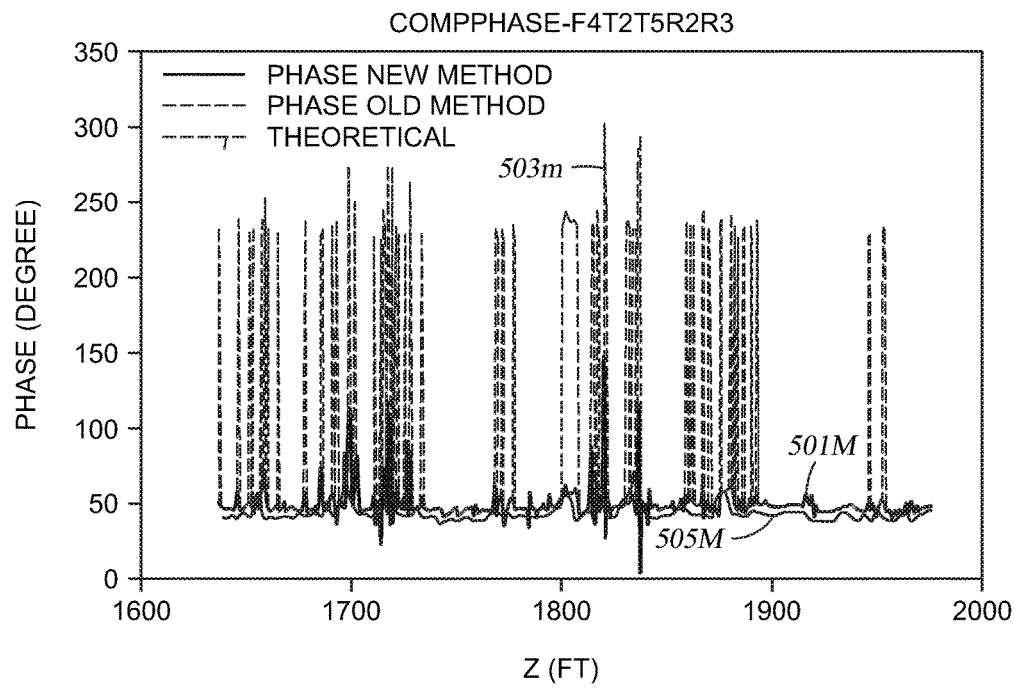
Figure 5N:
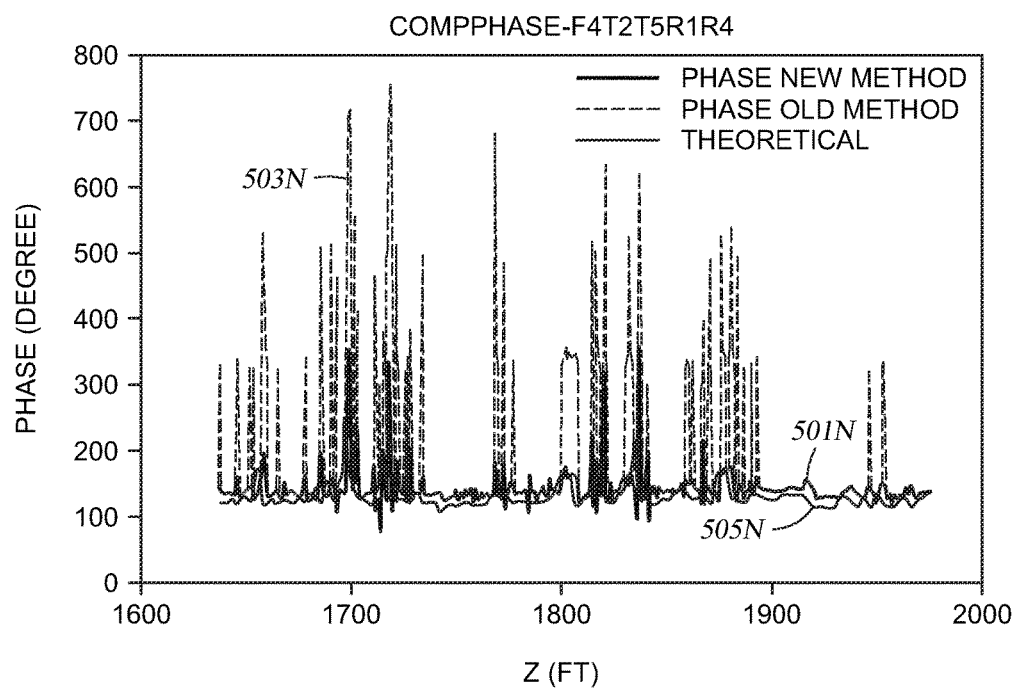
Figure 5O:
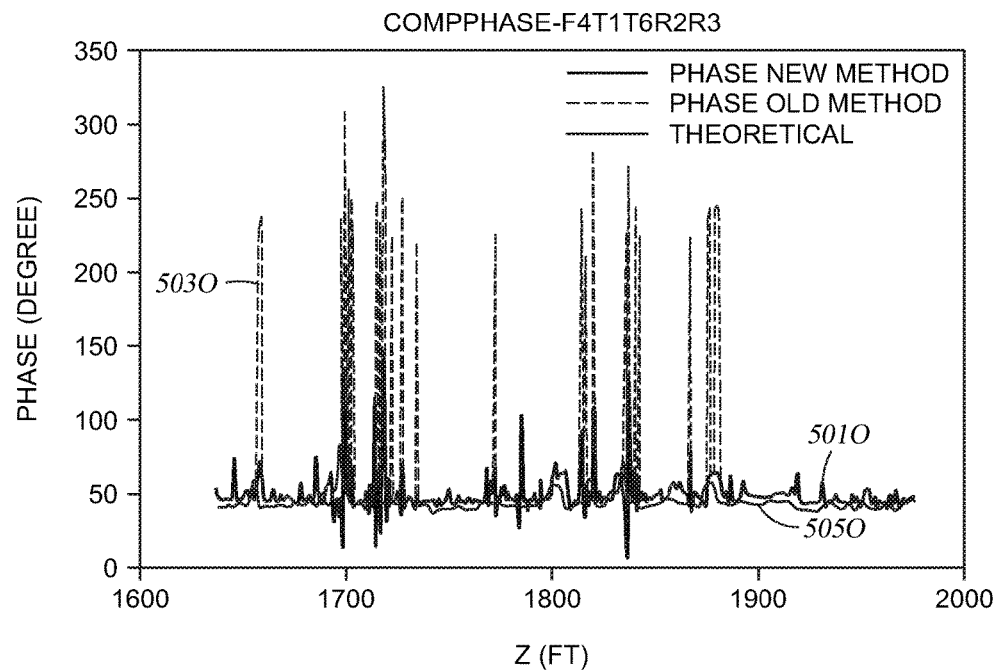
Figure 5P:
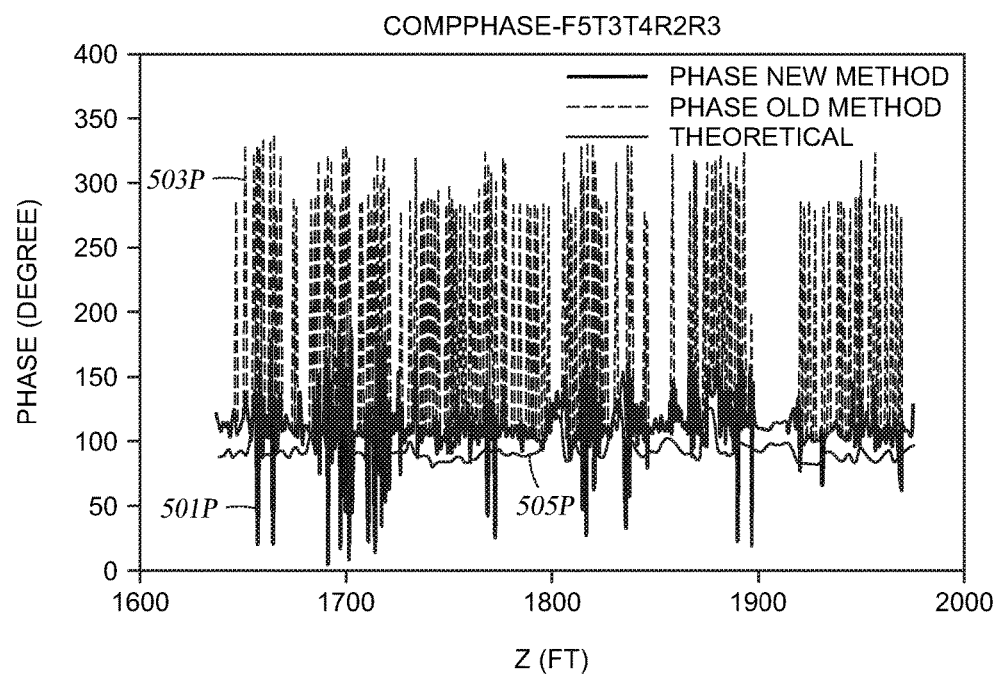
Figure 5Q:
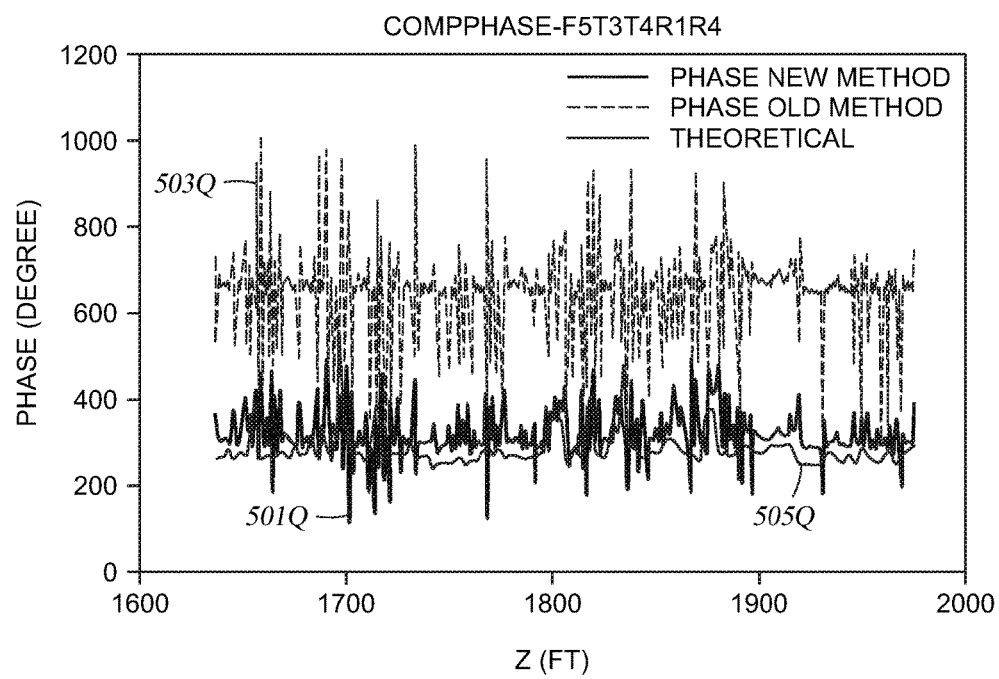
Figure 5R:
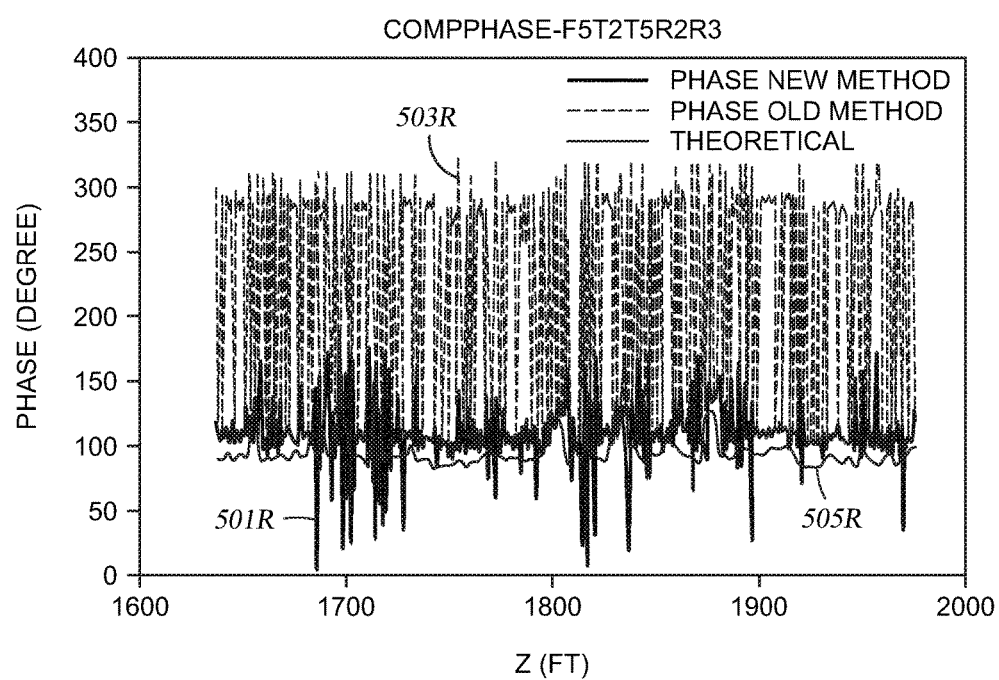
Figure 5S:
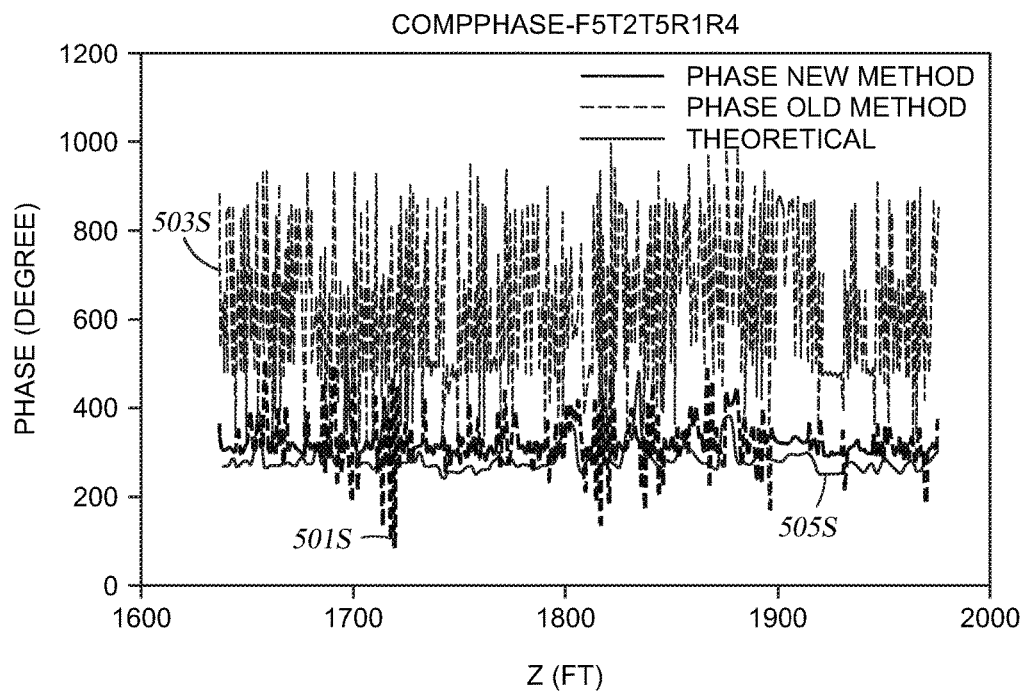
Figure 5T:
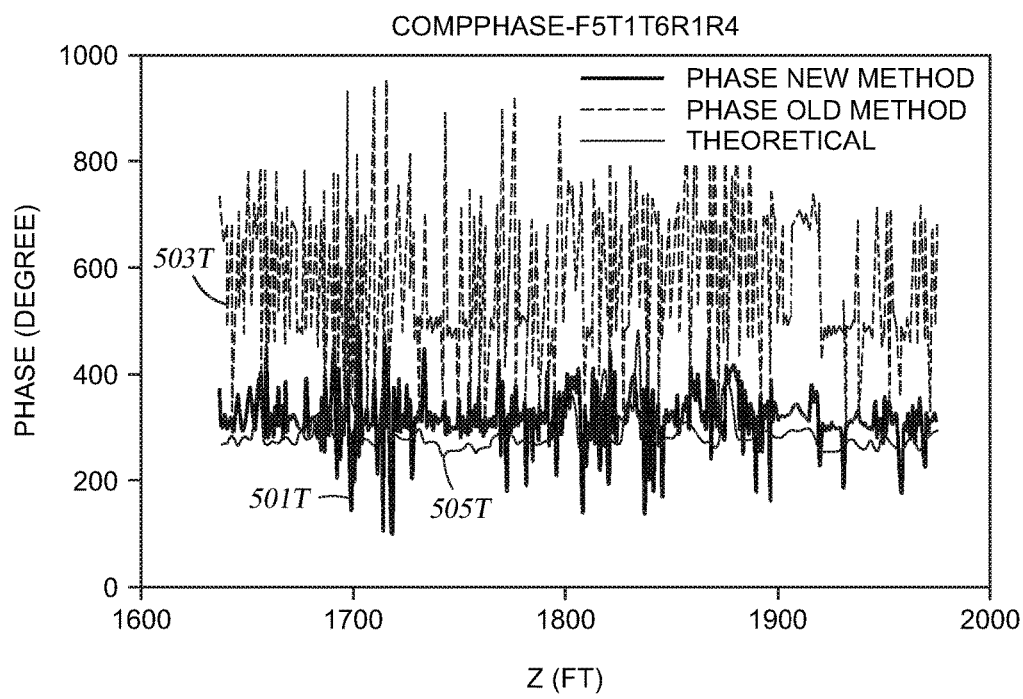

FIGS. 5A-5T show phase curves over the depth of a test well for different frequency, transmitter, and receiver selection (e.g., effective section length) combinations in accordance with embodiments of the present disclosure. FIGS. 6A-6H show conductivity and relative permittivity curves over the depth of a test well for different frequency, transmitter, and receiver selection (e.g., effective section length) combinations in accordance with embodiments of the present disclosure.

Figure 6A:
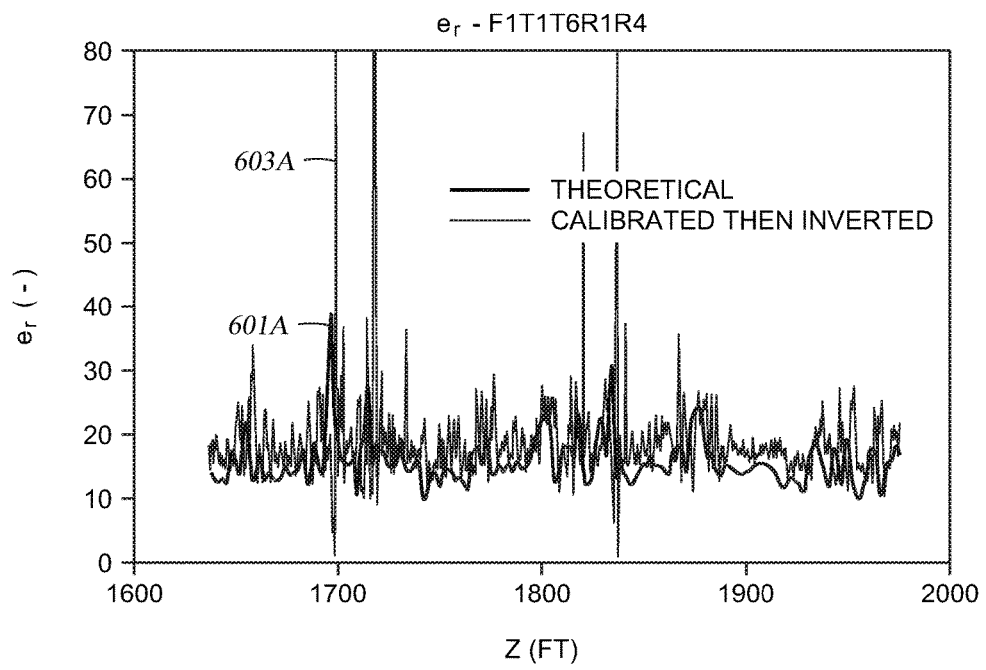
FIGS. 6A-6H show conductivity and relative permittivity curves over the depth of a test well in accordance with embodiments of the present disclosure.
Figure 6B:
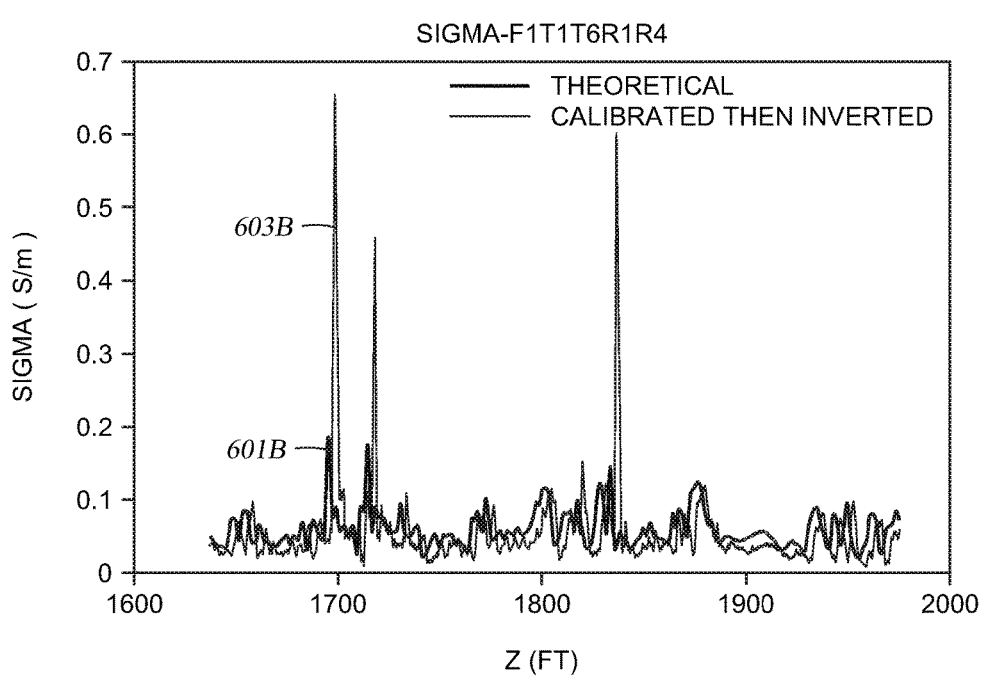
Figure 6C:
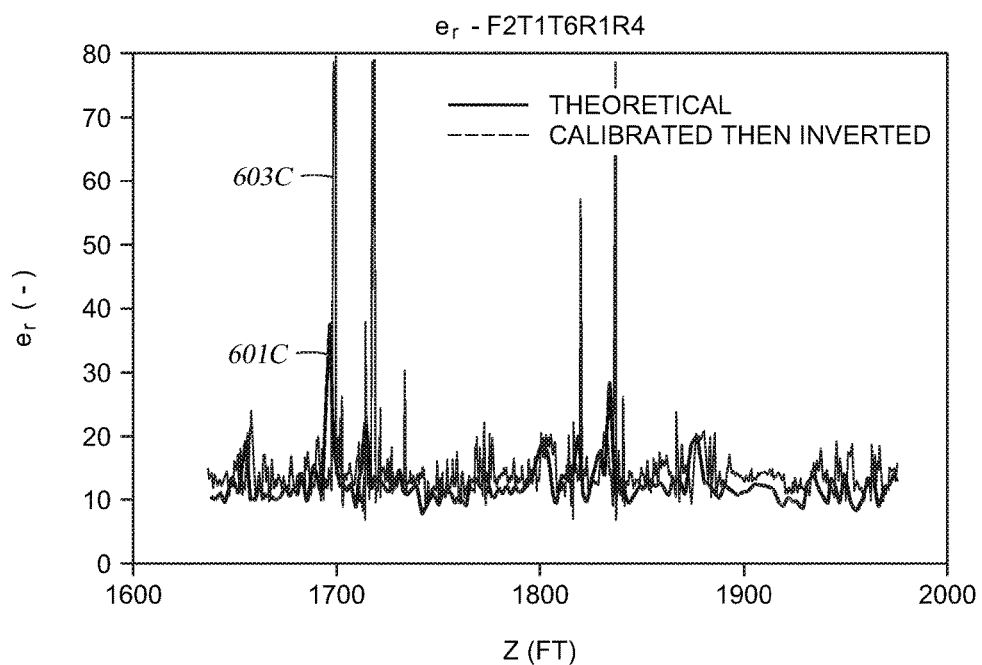
Figure 6D:
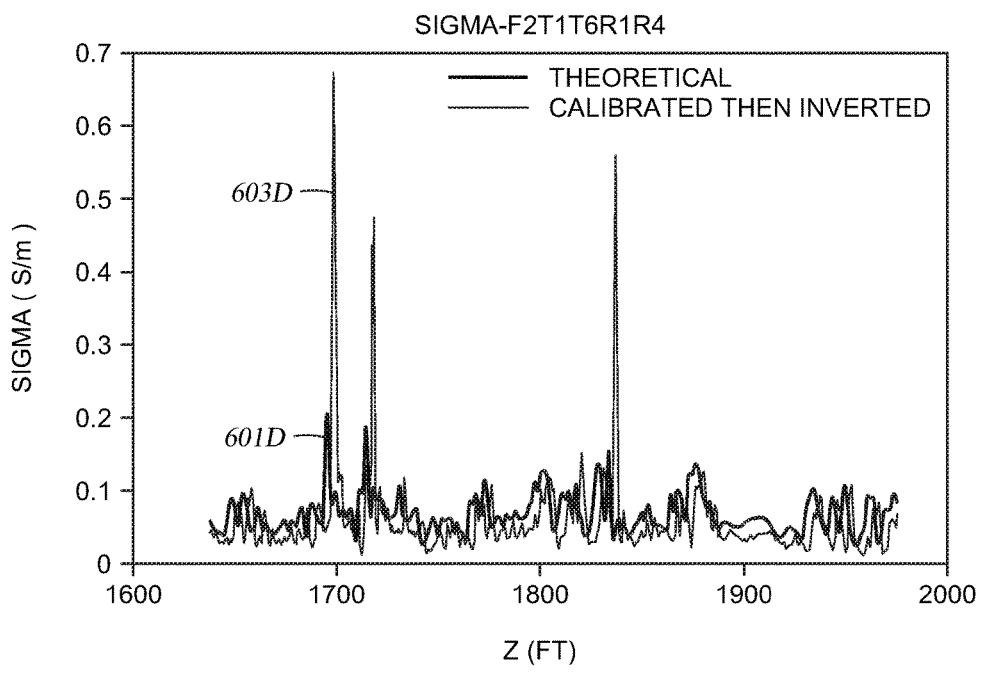
Figure 6E:
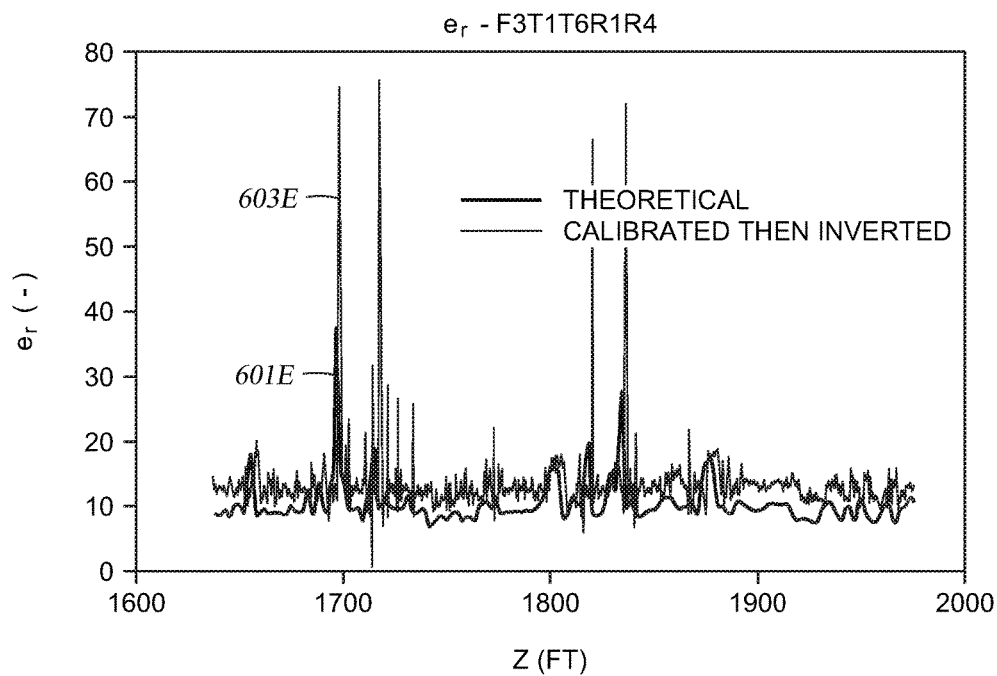
Figure 6F:
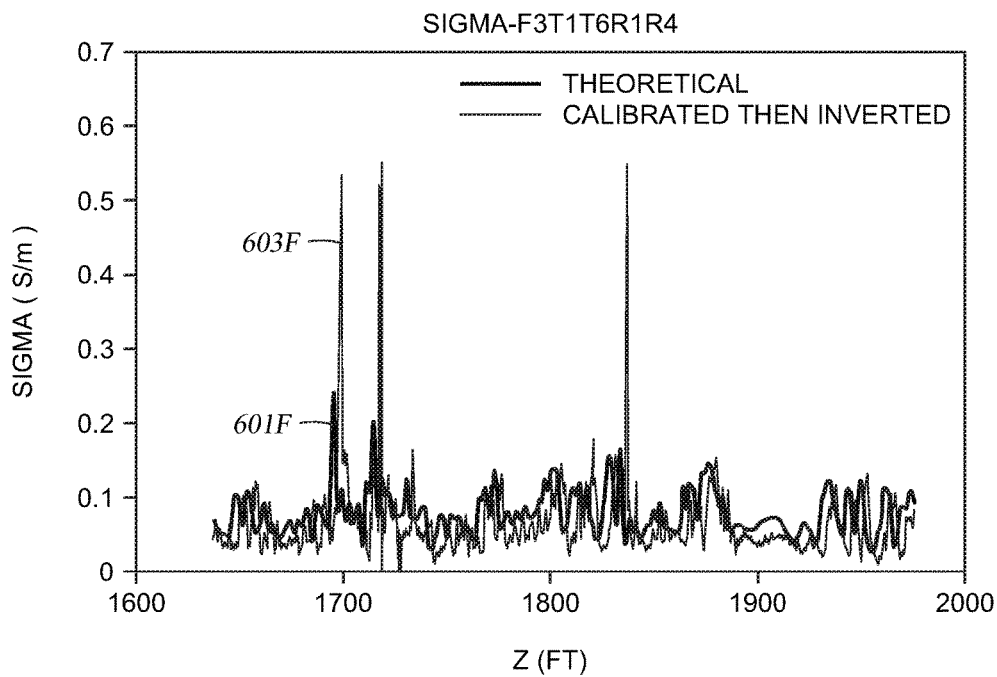
Figure 6G:
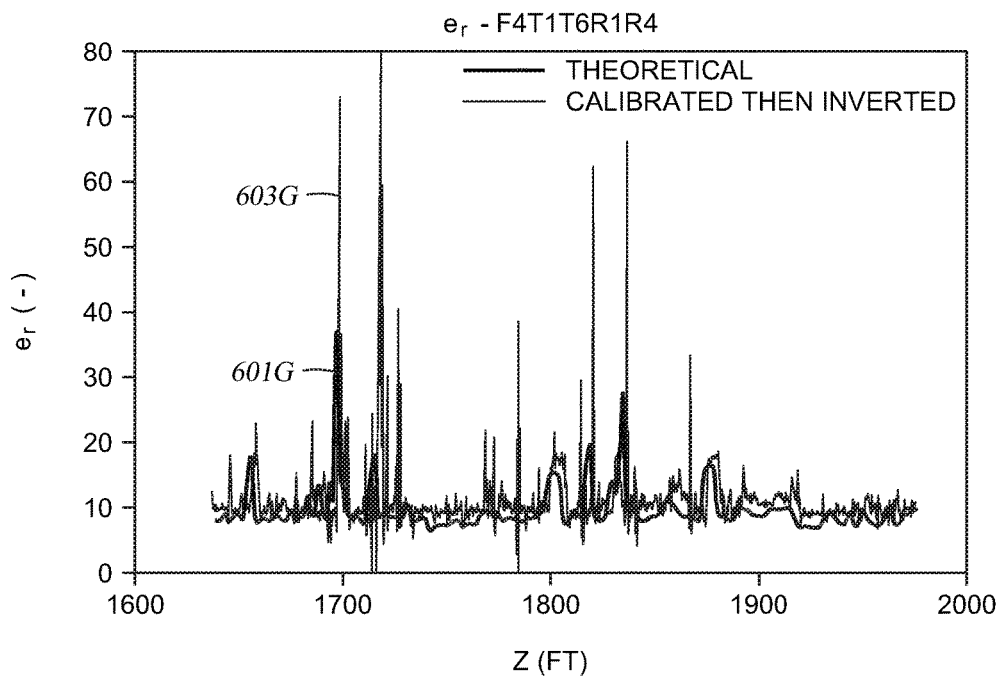
Figure 6H:
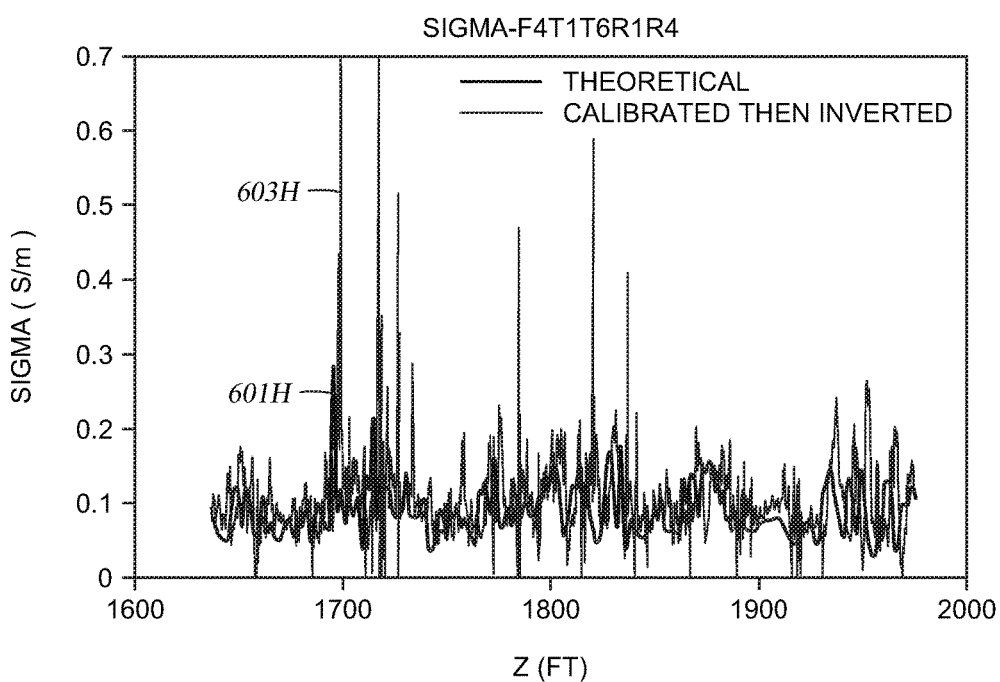

For example, FIG. 5A illustrates relative phase curves over the volume of interest corresponding to the tool section from the outermost receivers (e.g., uppermost receiver R1 and lowermost receiver R4, FIG. 3C) for the outermost transmitters (e.g., uppermost transmitter T1 and lowermost transmitter T6, FIG. 3C) at a first frequency. The Figures demonstrate that, in contrast to the conventional method, the method of phase shift estimation of the present disclosure approaches the true theoretical values along the depth of the borehole. FIGS. 6A and 6B, for example, illustrate the permittivity and conductivity curves, respectively, for the same selection.

Figure 7A:
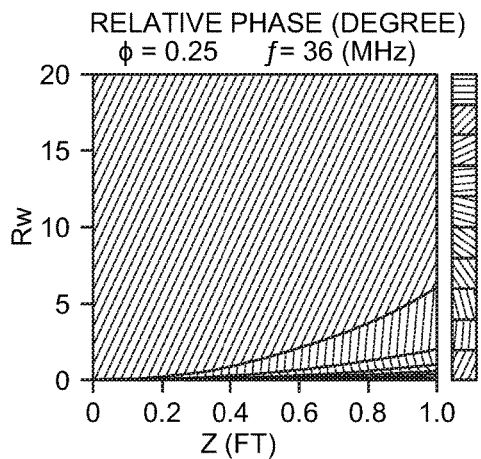
FIGS. 7A-7K show contour graphs of relative phase with respect to salinity and water saturation estimated using a transmission frequency of 36 Mhz and varying receiver spacings from the transmitter in accordance with embodiments of the present disclosure.
Figure 7B:
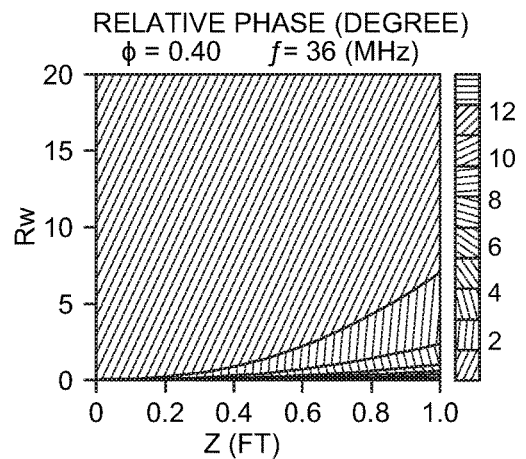
Figure 7C:
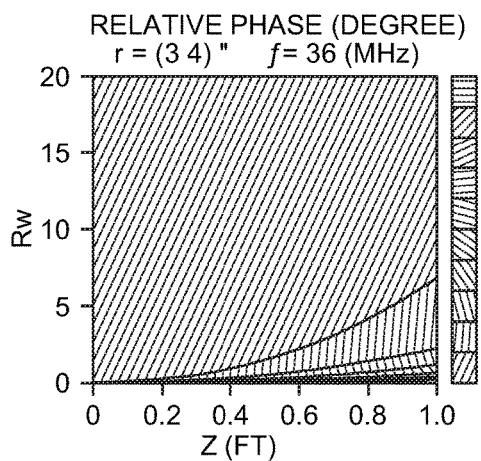
Figure 7D:
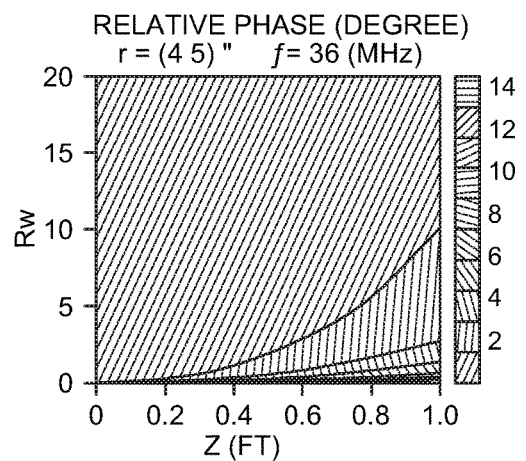
Figure 7E:
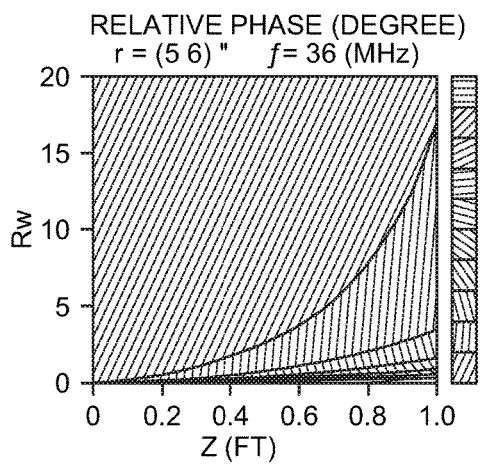
Figure 7F:
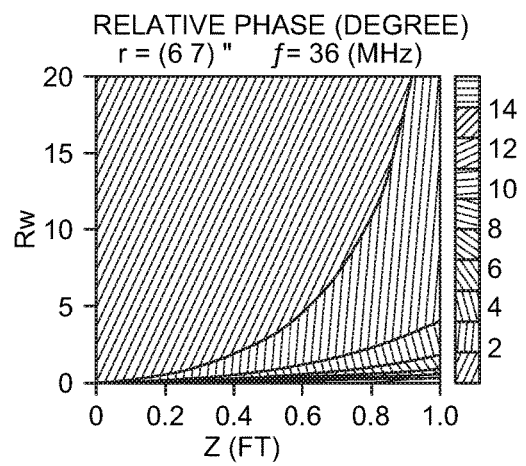
Figure 7G:
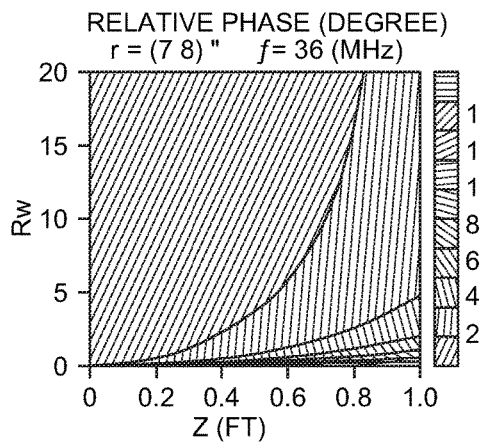
Figure 7H:
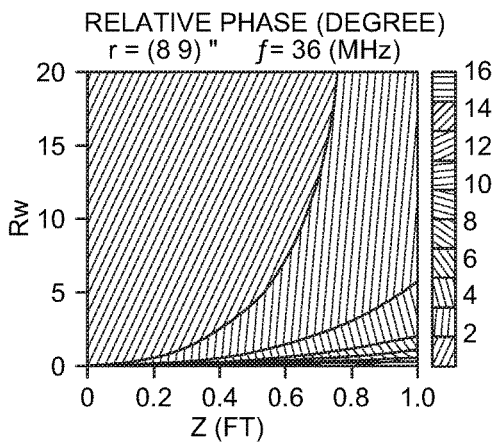
Figure 7I:
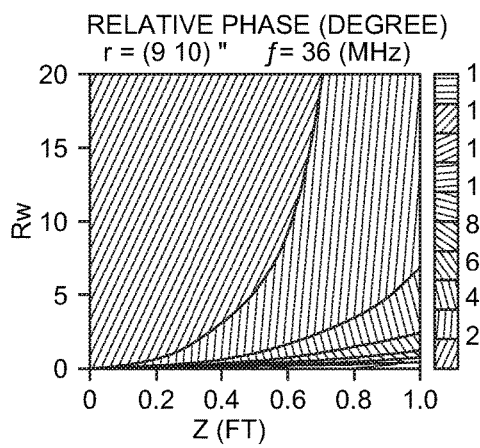
Figure 7J:
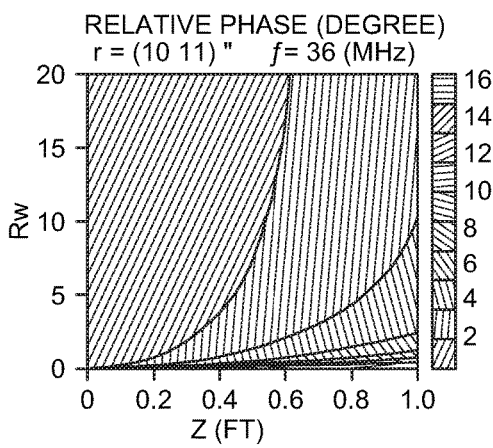
Figure 7K:
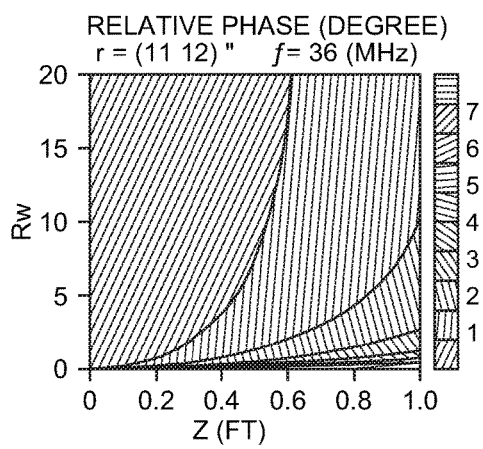
Figure 8A:
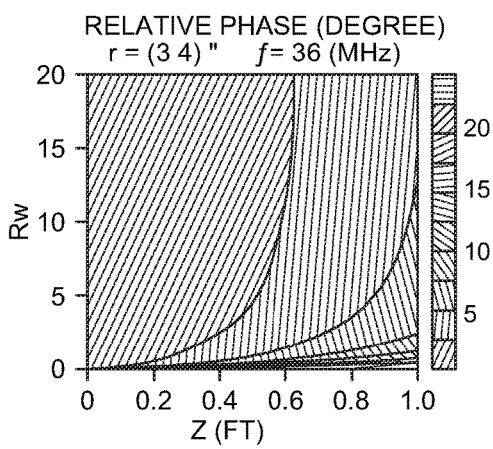
FIGS. 8A-8I show contour graphs of relative phase with respect to salinity and water saturation estimated using a transmission frequency of 84 Mhz and varying receiver spacings from the transmitter in accordance with embodiments of the present disclosure.
Figure 8B:
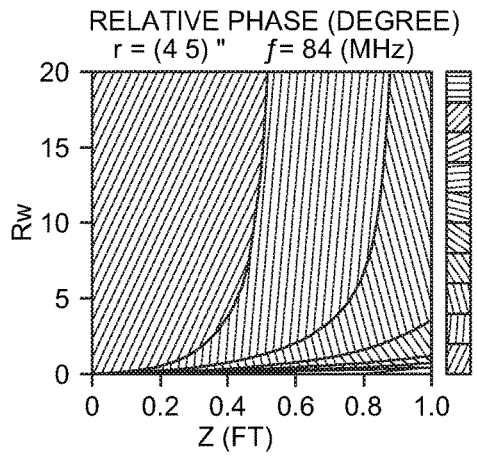
Figure 8C:
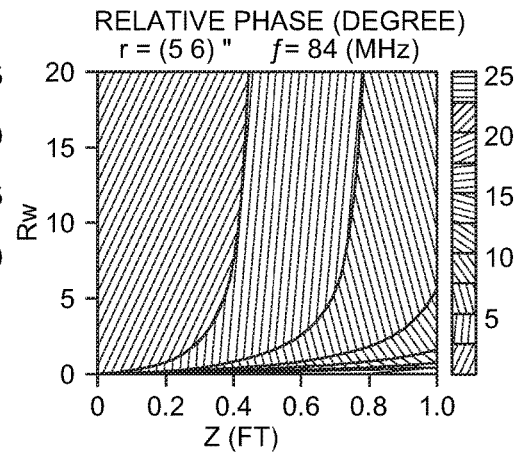
Figure 8D:
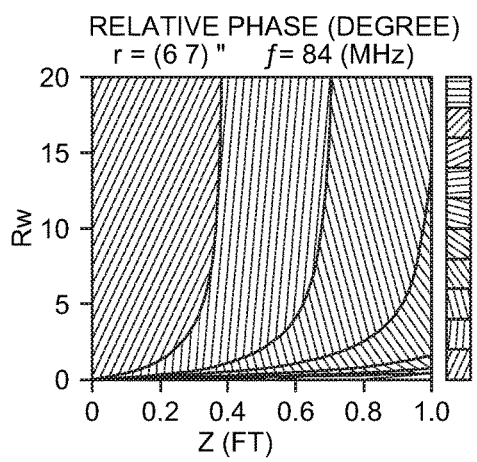
Figure 8E:
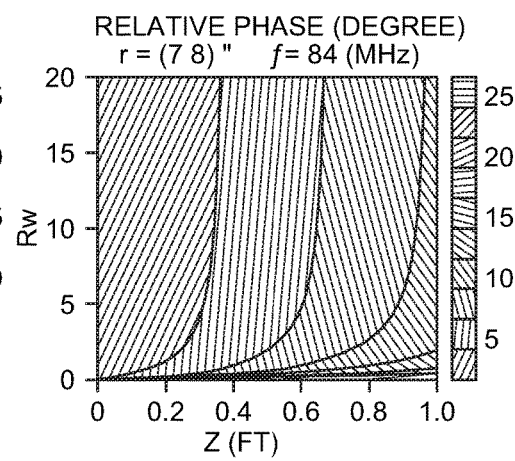
Figure 8F:
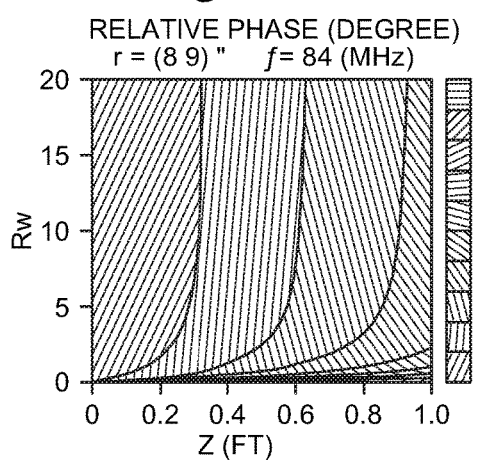
Figure 8G:
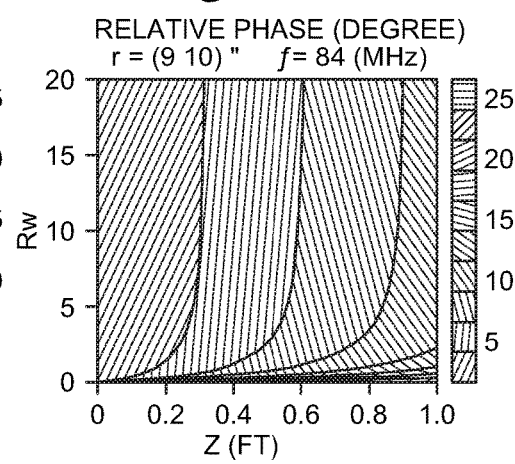
Figure 8H:
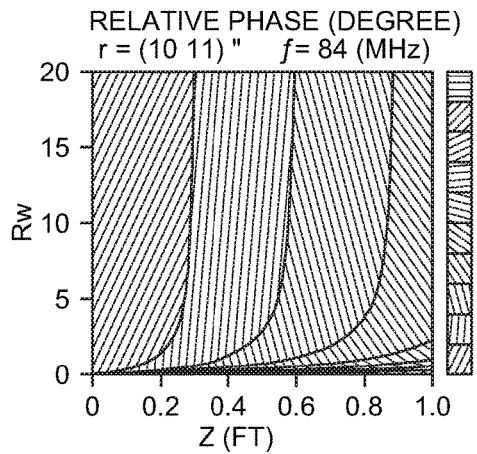
Figure 8I:
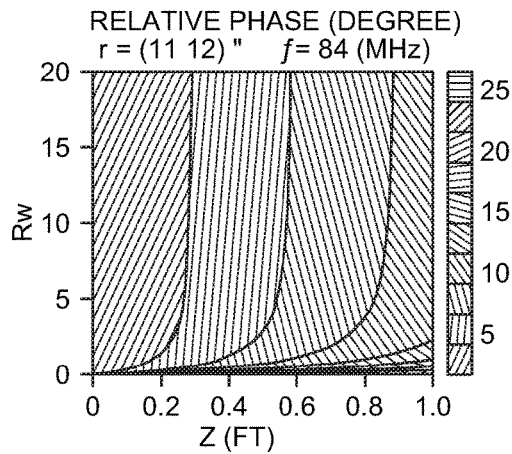
Figure 9A:
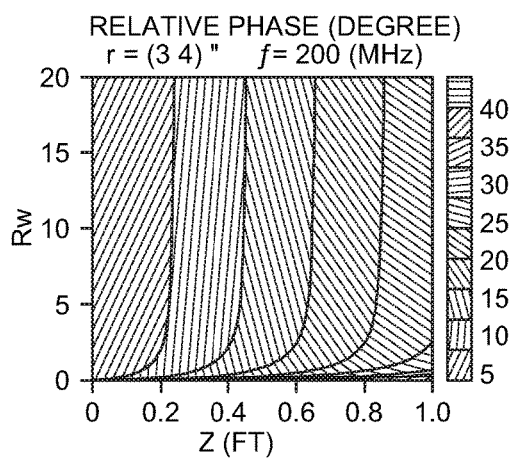
FIGS. 9A-9I show contour graphs of relative phase with respect to salinity and water saturation estimated using a transmission frequency of 200 Mhz and varying receiver spacings from the transmitter in accordance with embodiments of the present disclosure.
Figure 9B:
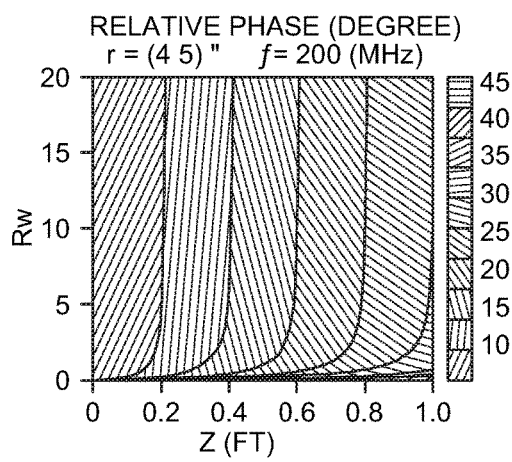
Figure 9C:
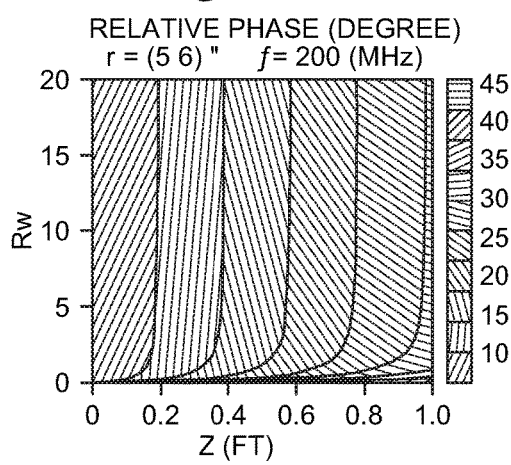
Figure 9D:
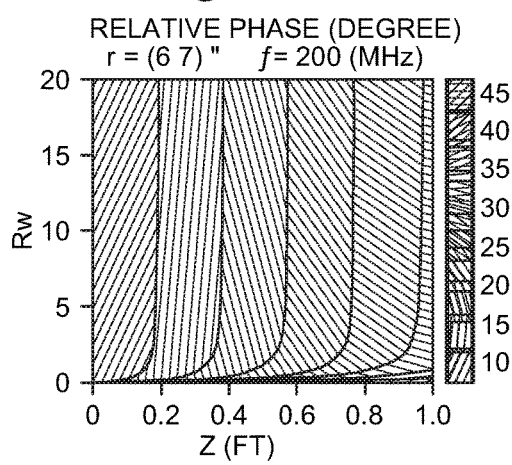
Figure 9E:
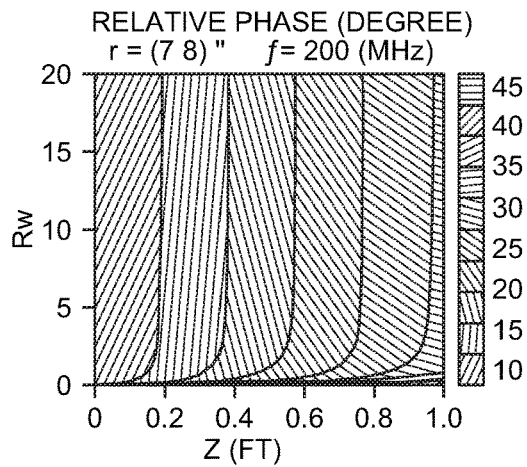
Figure 9F:
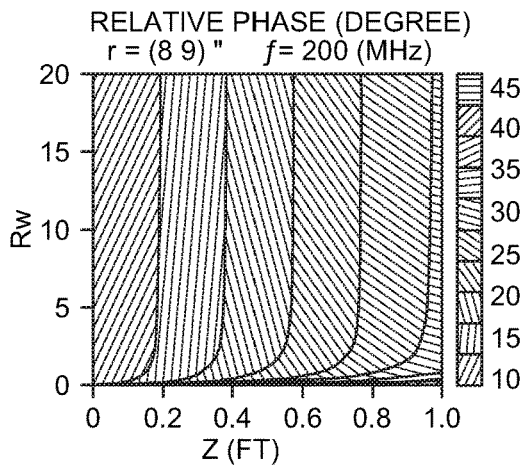
Figure 9G:
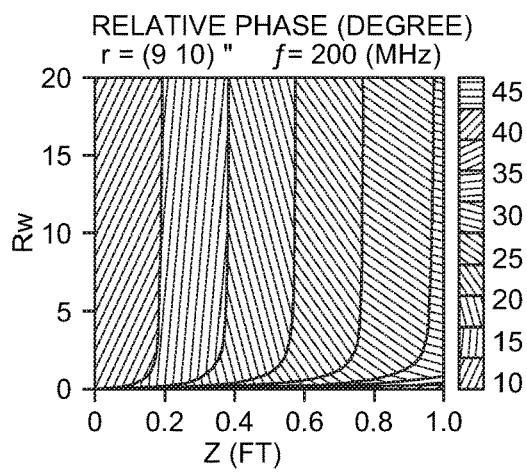
Figure 9H:
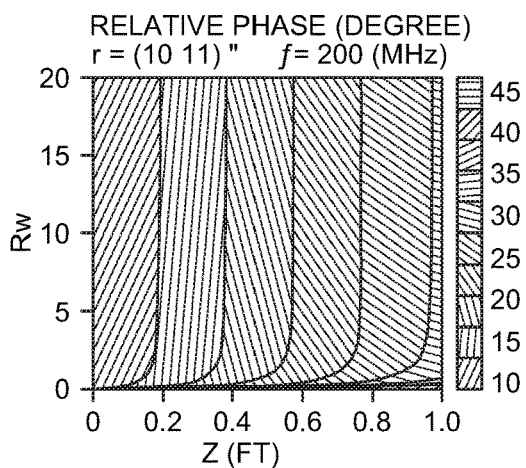
Figure 9I:
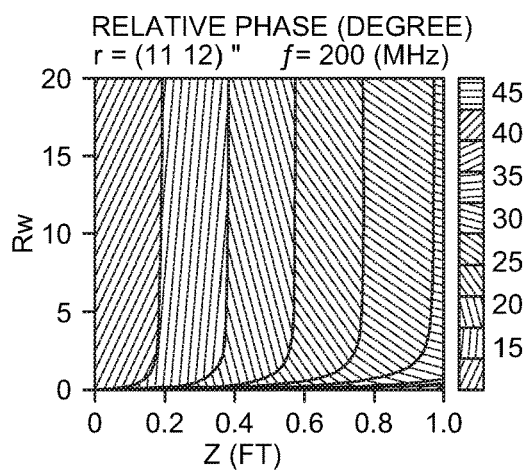
Figure 10A:
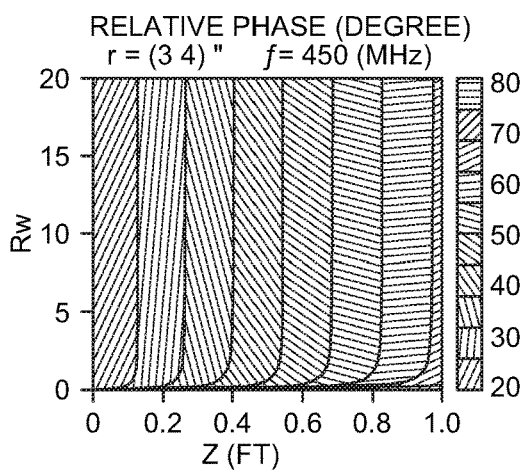
FIGS. 10A-10I show contour graphs of relative phase with respect to salinity and water saturation estimated using a transmission frequency of 450 Mhz and varying receiver spacings from the transmitter in accordance with embodiments of the present disclosure.
Figure 10B:
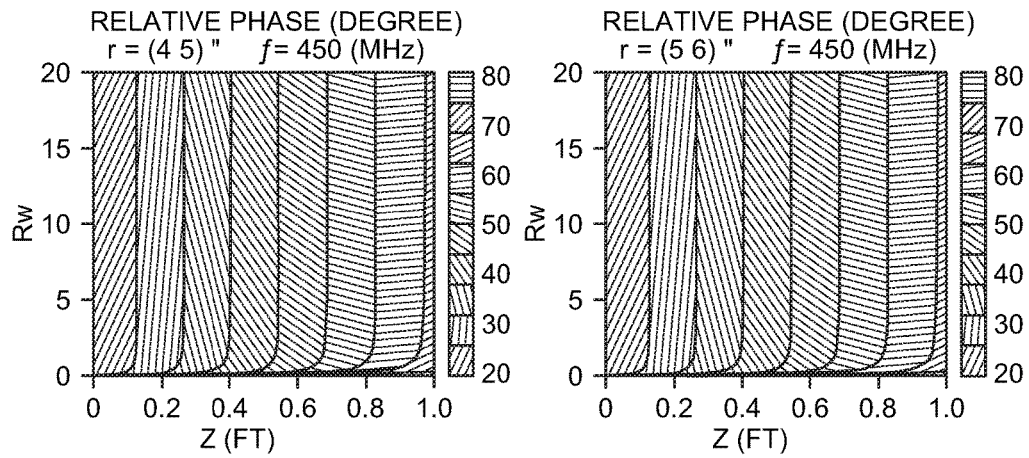
Figure 10C:
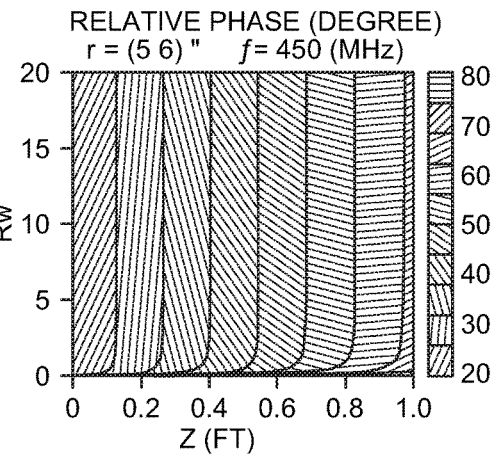
Figure 10D:
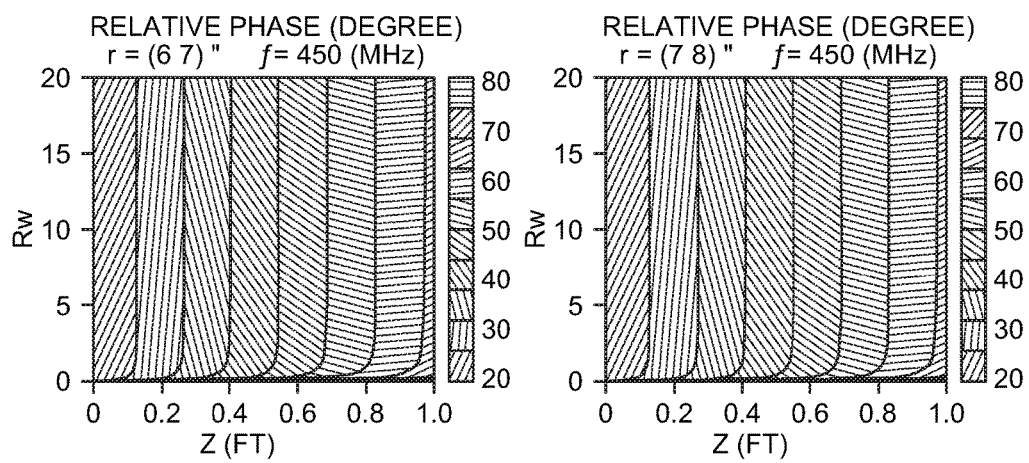
Figure 10E:
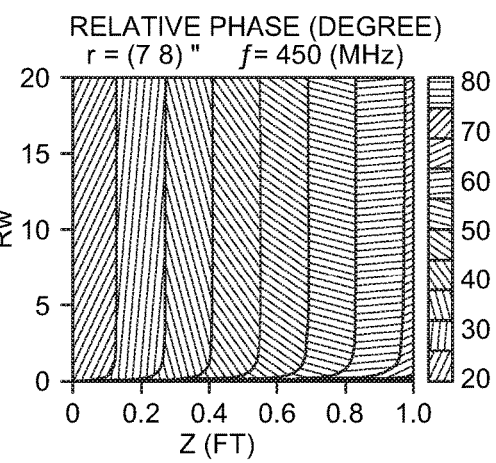
Figure 10F:
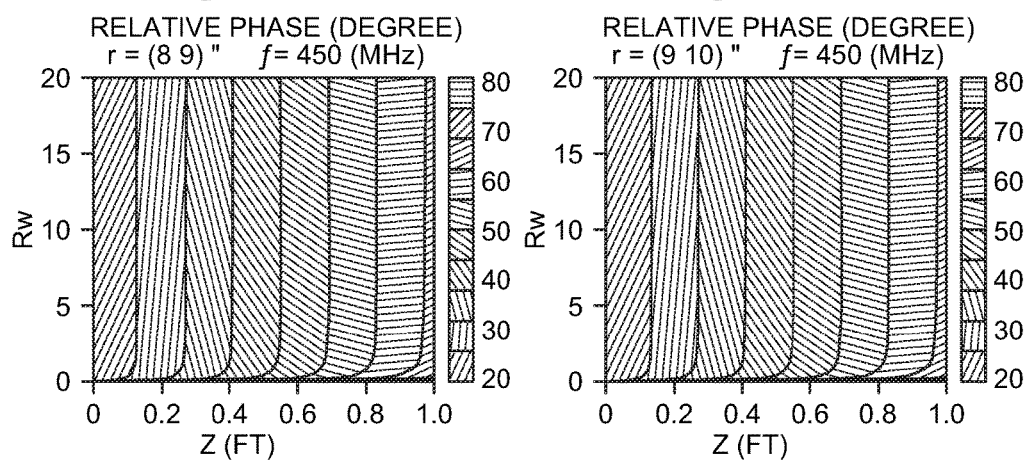
Figure 10G:
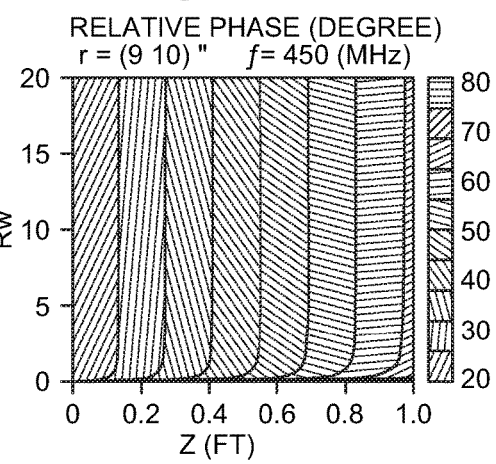
Figure 10H:
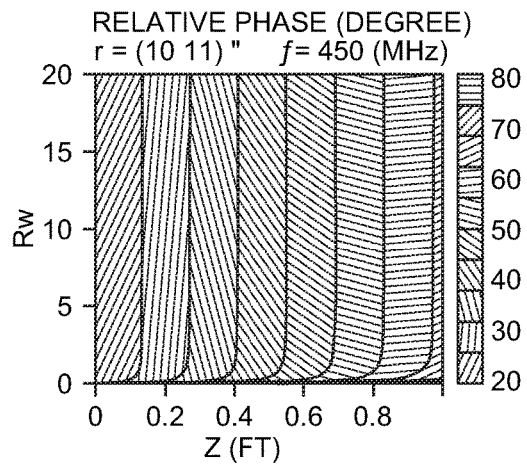
Figure 10I:
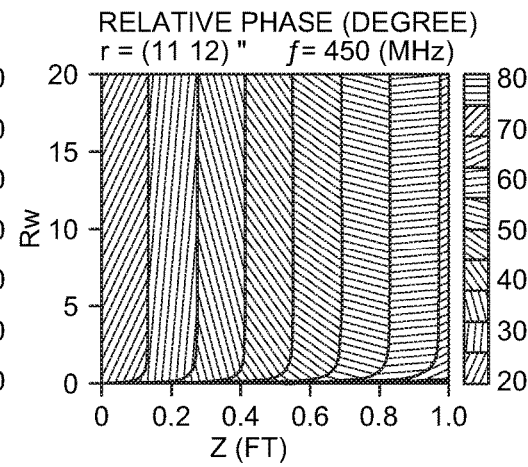
Figure 11A:
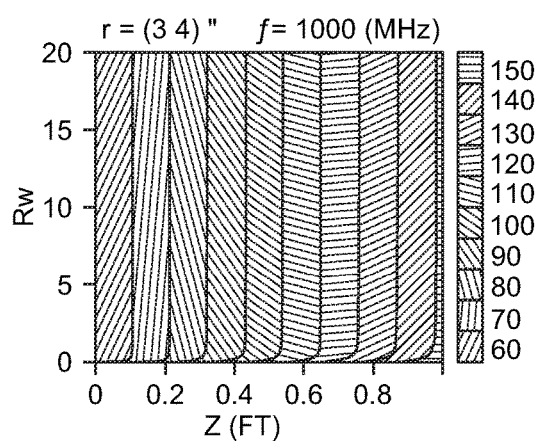
FIGS. 11A-11I show contour graphs of relative phase with respect to salinity and water saturation estimated using a transmission frequency of 1000 Mhz and varying receiver spacings from the transmitter in accordance with embodiments of the present disclosure.
Figure 11B:
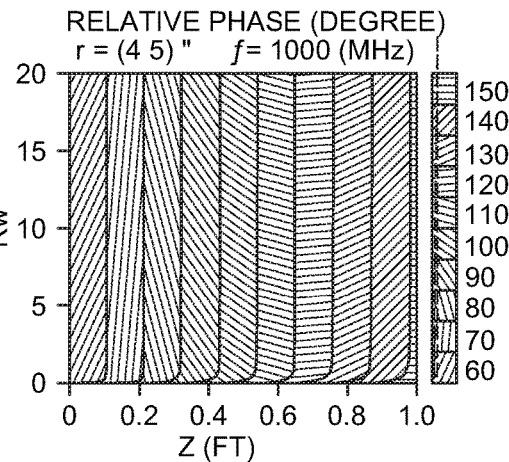
Figure 11C:
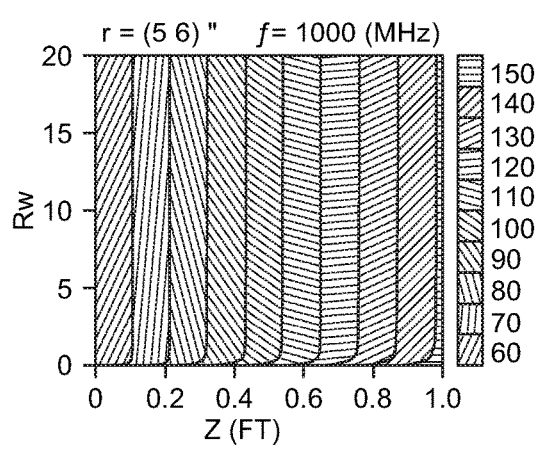
Figure 11D:
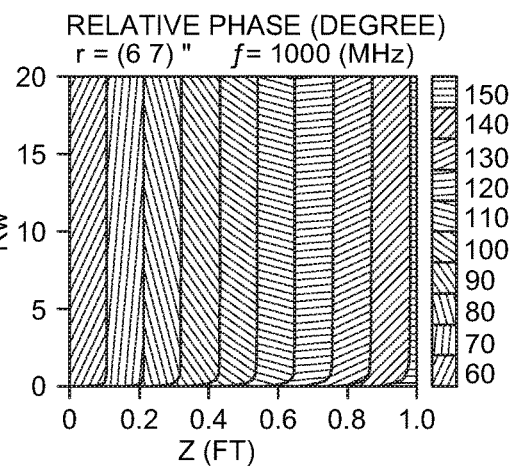
Figure 11E:
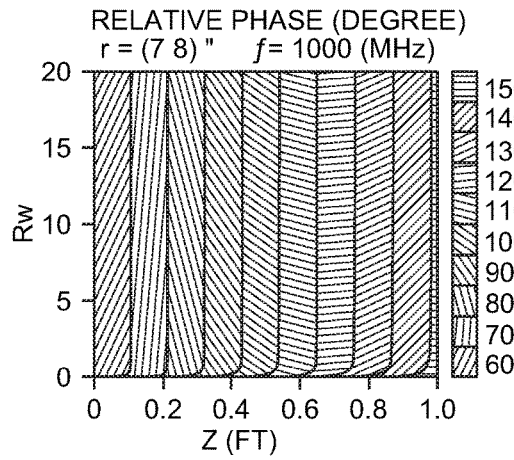
Figure 11F:
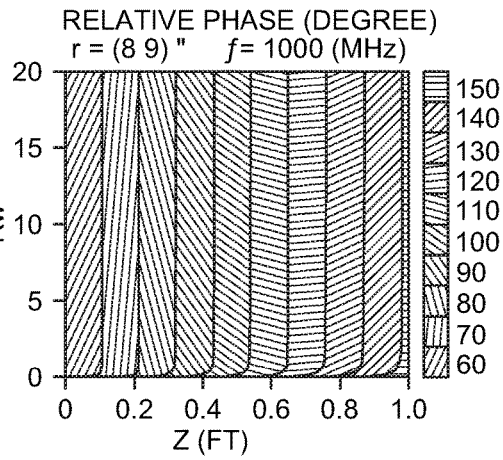
Figure 11G:
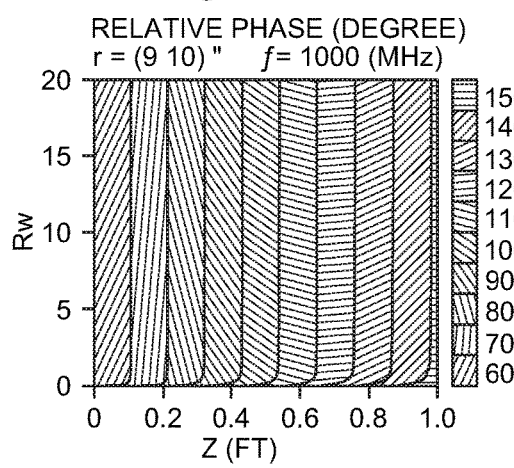
Figure 11H:
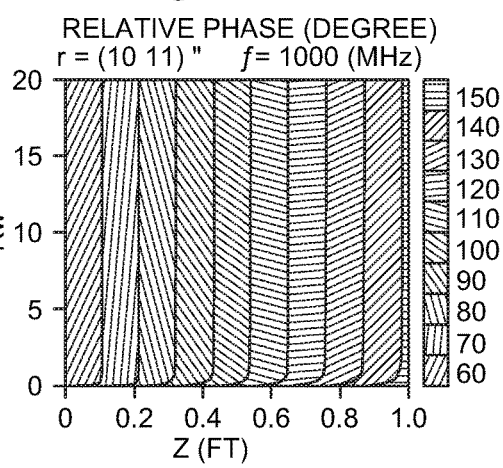
Figure 11I:
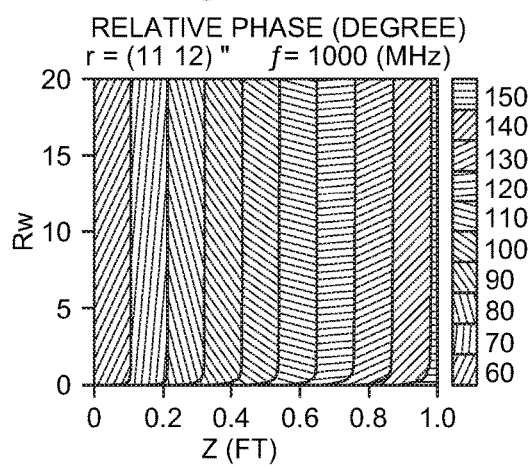

FIGS. 7A-7K show contour graphs of relative phase with respect to salinity and water saturation estimated using a transmission frequency of 36 Mhz. FIGS. 7A and 7B illustrate the relative phase with respect to the parameters of interest at r=[3 4], for a formation having porosity of 0.25 and 0.4, respectively. The term r is a vector containing the distance from the transmitter to the first and second receiver and is represented in units of inches. Ø=0.4 may be considered as the upper limit of the porosity for the formation. The increase in relative phase with porosity is intuitive, as higher porosity corresponds with a higher volume fraction of water (for a fixed volume fraction of oil), and water is the component of the formation with the highest permittivity. FIGS. 7C-7K illustrate results from various receiver spacings from the transmitter in accordance with embodiments of the present disclosure.

FIGS. 8A-8I show contour graphs illustrating results of relative phase with respect to salinity and water saturation estimated using a transmission frequency of 84 Mhz and varying receiver spacings from the transmitter in accordance with embodiments of the present disclosure.

FIGS. 9A-9I show contour graphs illustrating results of relative phase with respect to salinity and water saturation estimated using a transmission frequency of 200 Mhz and varying receiver spacings from the transmitter in accordance with embodiments of the present disclosure.

FIGS. 10A-10I show contour graphs illustrating results of relative phase with respect to salinity and water saturation estimated using a transmission frequency of 450 Mhz and varying receiver spacings from the transmitter in accordance with embodiments of the present disclosure.

FIGS. 11A-11I show contour graphs illustrating results of relative phase with respect to salinity and water saturation estimated using a transmission frequency of 1000 Mhz and varying receiver spacings from the transmitter in accordance with embodiments of the present disclosure.

FIG. 12 shows an information processing system 1200, which may be implemented with a hardware environment that includes a processor 1201, an information storage medium 1210, an input device 1220, processor memory 1230, and may include peripheral information storage medium 1240. The hardware environment may be in the well, at the rig, or at a remote location. Moreover, the several components of the hardware environment may be distributed among those locations. The input device 1220 may be any data reader or user input device, such as data card reader, keyboard, USB port, etc. The information storage medium 1210 stores information provided by the detectors. Information storage medium 1210 may include any non-transitory computer-readable medium for standard computer information storage, such as a USB drive, memory stick, hard disk, removable RAM, EPROMs, EAROMs, flash memories, optical disks, hard disks, or other commonly used memory storage system known to one of ordinary skill in the art including Internet or network based storage. Information storage medium 1210 stores a program that when executed causes information processor 1201 to execute the disclosed methods. Information storage medium 1210 may also store the formation information provided by the user, or the formation information may be stored in a peripheral information storage medium 1240, which may be any standard computer information storage device, such as a USB drive, memory stick, hard disk, removable RAM, or other commonly used memory storage system known to one of ordinary skill in the art including Internet or network based storage. Processor 1201 may be any form of processor or mathematical processing hardware, including Internet or network based hardware. When the program is loaded from information storage medium 1210 into processor memory 1230 (e.g. computer RAM), the program, when executed, causes information processor 1201 to retrieve sensor information from either information storage medium 1210 or peripheral information storage medium 1240 and process the information to estimate a parameter of interest. Information processor 1101 may be located on the surface or downhole (e.g., downhole tool 100).

Implicit in the processing of the data is the use of a computer program implemented on a suitable non-transitory machine-readable medium (non-transitory computer-readable medium) that enables the processor to perform the control and processing. The term processor as used in this application is intended to include such devices as field programmable gate arrays (FPGAs). The non-transitory machine-readable medium may include ROMs, EPROMs, EAROMs, Flash Memories, Optical disks, and Hard disks. As noted above, the processing may be done downhole or at the surface, by using one or more processors. In addition, results of the processing, such as an image of a resistivity property or permittivity, can be stored on a suitable medium.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, a processor includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

Thus, configuration of the processor may include operative connection with resident memory and peripherals for executing programmed instructions. In some embodiments, estimation of the parameter of interest may involve applying a model. The model may include, but is not limited to, (i) a mathematical equation, (ii) an algorithm, (iii) a database of associated parameters, or a combination thereof.

"Substantially different" as used herein means not substantially the same. "Substantially the same," or "substantially similar" as used herein means a value consistent with a general formation structure or feature, or having a value within a common statistical deviation, such as within one standard deviation, within 5 percent, within 1 percent of a moving average and so on. Substantially the same refers to values within the generally held value for common deviation, such as, for example, due to noise.

$\theta_{R_j}^{T_i}$: Phase value recorded at receiver j when transmitter i is fired θ TiRj: Part of θRjTi that is coming from EM wave propagating in formation θRjsh: Value of phase shift at receiver j θRjRkcom: Compensated measurement between receivers j and k While the foregoing disclosure is directed to specific embodiments of the disclosure, various modifications will be apparent to those skilled in the art. It is intended that all variations be embraced by the foregoing disclosure.

What is claimed is:

1. A method of evaluating an earth formation intersected by a borehole, the method comprising:
    exciting an upper transmitter and a lower transmitter on a carrier in the borehole at at least one frequency;
    receiving signals at a plurality of receivers between the upper transmitter and the lower transmitter on the carrier responsive to the excitation, wherein a section of the carrier includes a plurality of receivers;
    estimating a phase shift greater than 2π radians attributable to only a volume of interest of the earth formation adjacent to a section of the carrier, the section having a plurality of portions and corresponding to the plurality of receivers, to mitigate effects of phase wrapping by estimating phase shifts attributable only to portions of the volume of interest adjacent to corresponding portions of the plurality of portions of the section, the corresponding portions being between a plurality of pairs of receivers of the plurality of receivers;
    wherein each pair of the plurality of pairs of receivers is positioned at a corresponding distance that is no more than half of a shortest wavelength of at least one wavelength of the at least one frequency associated with the received signals.

2. The method of claim 1 wherein estimating the phase shifts attributable only to portions of the volume of interest adjacent to corresponding portions of the section between each of the pairs of receivers comprises reducing by 180 degrees calculated phase shifts for each of the portions of the volume of interest not within a range from a pre-determined lower limit to 180 degrees from the pre-determined lower limit.

3. The method of claim 2, comprising identifying the pre-determined lower limit based on a distance between each of the pairs of receivers, a range of values for the at least one frequency, and a range of expected values for at least one formation property.

4. The method of claim 1 wherein each of the at least one frequency is at least 200 kHz.

5. The method of claim 1 wherein at least one of the at least one frequency is at least 1 GHz.

6. The method of claim 1 comprising using the estimated phase shift and an estimated signal attenuation to estimate a formation property of the volume of interest.

7. The method of claim 6 wherein the formation property of the volume of interest comprises at least one of: i) resistivity; ii) conductivity; and iii) permittivity.

8. The method of claim 6, comprising estimating the formation property by using the estimated signal attenuation and the estimated phase shift in an inversion by modeling the earth formation as a homogenous wholespace.

9. The method of claim 8 further comprising conducting a validity check on a model resulting from the modeling by comparing the formation property estimated for the section with a formation property estimated for the portion of the section.

10. The method of claim 9, comprising conducting at least one of: i) an interpolation operation, and ii) a filtering operation, upon determining that the formation parameter estimated for the section is substantially different that the formation parameter estimated for the portion of the section.

11. The method of claim 6, further comprising:
using the estimated phase shift and an estimated signal attenuation to estimate a first estimated value of a formation property of the volume of interest;
conducting a second excitation comprising exciting a second upper transmitter non-collocated with the upper transmitter and a second lower transmitter non-collocated with the lower transmitter on a carrier in the borehole at at least one frequency;
receiving signals at the plurality of receivers responsive to the second excitation;
estimating a second phase shift in the received signals responsive to the second excitation attributable to only a volume of interest of the formation adjacent to a section of the carrier corresponding to the plurality of receivers by estimating phase shifts attributable only to portions of the volume of interest adjacent to corresponding portions of the section between pairs of receivers of the plurality of receivers; and
using the estimated second phase shift and an estimated second signal attenuation to estimate a second estimated value of a formation property of the volume of interest; and
conducting a radial layer analysis upon determining that the first estimated value of the formation property and the second estimated value of the formation property are not substantially similar.

12. The method of claim 6, wherein the at least one frequency comprises a series of frequencies, and the method further comprises conducting a quality check by comparing estimated formation parameters corresponding to the frequencies to a trend comprising at least one of: i) estimated formation parameters increase with increases in frequency, and ii) estimated formation parameters decrease with increases in frequency.

13. The method of claim 12, comprising conducting at least one of an interpolation operation and a filtering operation upon determining that the formation parameters fail to follow the trend.

14. The method of claim 1 comprising exciting an upper transmitter and a lower transmitter on a carrier in the borehole at a plurality of frequencies at each of a plurality of borehole depths, wherein no frequency of the plurality of frequencies is within 50 MHz of another frequency of the plurality of frequencies and no depth of the plurality of depths is within a distance d of another depth of the plurality of depths, wherein d=0.1 λs, and wherein λs is the shortest wavelength of those wavelengths associated with the received signals.

15. The method of claim 14 wherein the information received in the signals lacks sufficient information density to plot variations in phase shift as a smooth curve.

16. The method of claim 1 wherein the excitation of the upper transmitter and the lower transmitter produce electromagnetic waves which propagate through the volume of interest to the plurality of receivers.

17. A method of evaluating an earth formation intersected by a borehole, the method comprising:
exciting an upper transmitter and a lower transmitter on a carrier in the borehole at at least one frequency;
receiving signals at a plurality of receivers between the upper transmitter and the lower transmitter on the carrier responsive to the excitation;
estimating a phase shift greater than 2π radians attributable to only a volume of interest of the earth formation adjacent to a section of the carrier between a pair of receivers of the plurality of receivers to mitigate effects of phase wrapping using:
a first relative phase value comprising a measured phase shift between signals received at a first receiver of the pair of receivers and signals received at a second receiver responsive to excitation of the upper transmitter; and
a second relative phase value comprising a measured phase shift between signals received at a second receiver of the pair of receivers and signals received at a first receiver responsive to excitation of the lower transmitter.

18. The method of claim 17 wherein estimating the phase shift attributable to only a volume of interest of the formation adjacent to a section of the carrier between a pair of receivers comprises:
calculating a phase shift using the first relative phase value and the second relative phase value; and
reducing the calculated phase shift by 180 degrees if the calculated phase shift is not within a range from a pre-determined lower limit to 180 degrees from the pre-determined lower limit.

19. The method of claim 17 wherein the transmitters and receivers are unsynchronized.

20. An apparatus for evaluating an earth formation intersected by a borehole, the apparatus comprising:
a carrier configured to convey an upper transmitter, a lower transmitter, and a plurality of receivers between the upper transmitter and the lower transmitter in the borehole; and
at least one processor configured to execute a method, the method comprising:
exciting an upper transmitter and a lower transmitter in the borehole at at least one frequency;
receiving signals at a plurality of receivers between the upper transmitter and the lower transmitter on the carrier responsive to the excitation, wherein a section of the carrier includes a plurality of receivers; and
estimating a phase shift greater than 2π radians attributable to only a volume of interest of the formation adjacent to a section of the carrier corresponding to the plurality of receivers to mitigate effects of phase wrapping by estimating phase shifts attributable only to portions of the volume of interest adjacent to corresponding portions of the section between a plurality of pairs of receivers of the plurality of receivers;

wherein each pair of the plurality of pairs of receivers is positioned at a corresponding distance that is no more than half of a shortest wavelength of at least one wavelength of the at least one frequency associated with the received signals.

21. The apparatus of claim 20 wherein the at least one processor is configured to estimate the phase shifts attributable only to portions of the volume of interest adjacent to corresponding portions of the section between each pair of receivers by reducing by 180 degrees calculated phase shifts for each of the portions of the volume of interest not within a range from a pre-determined lower limit to 180 degrees from the pre-determined lower limit.

22. An apparatus for evaluating an earth formation intersected by a borehole, the apparatus comprising:
   a carrier configured to convey an upper transmitter, a lower transmitter, and a plurality of receivers between the upper transmitter and the lower transmitter in the borehole; and
   at least one processor configured to execute a method, the method comprising:
   exciting the upper transmitter and the lower transmitter in the borehole at at least one frequency;
   receiving signals at a plurality of receivers responsive to the excitation; and
   estimating a phase shift greater than $2\pi$ radians attributable to only a volume of interest of the earth formation adjacent to a section of the carrier between a pair of receivers of the plurality of receivers to mitigate effects of phase wrapping using:
   a first relative phase value comprising a measured phase shift between signals received at a first receiver of the pair of receivers and signals received at a second receiver responsive to excitation of the upper transmitter; and
   a second relative phase value comprising a measured phase shift between signals received at a second receiver of the pair of receivers and signals received at a first receiver responsive to excitation of the lower transmitter.

23. A method of evaluating an earth formation intersected by a borehole, the method comprising:
   exciting an upper transmitter and a lower transmitter on a carrier in the borehole at at least one frequency;
   receiving signals at a plurality of receivers between the upper transmitter and the lower transmitter on the carrier responsive to the excitation, wherein a section of the carrier includes a plurality of receivers;
   estimating a phase shift greater than $2\pi$ radians attributable to only a volume of interest of the earth formation adjacent to a section of the carrier corresponding to the plurality of receivers to mitigate effects of phase wrapping by estimating phase shifts attributable only to portions of the volume of interest adjacent to corresponding portions of the section between pairs of receivers of the plurality of receivers;
   wherein the upper transmitter, the lower transmitter and each of the plurality of receivers has a corresponding unknown internal electronic equipment phase shift error.

24. The method of claim 23 wherein at least one of the corresponding unknown internal electronic equipment phase shift errors is dependent upon at least one of i) temperature; and ii) pressure.

* * * * *